United States Patent
Ahuja et al.

(10) Patent No.: US 10,659,496 B2
(45) Date of Patent: May 19, 2020

(54) INSERTION AND CONFIGURATION OF INTERFACE MICROSERVICES BASED ON SECURITY POLICY CHANGES

(71) Applicant: ShieldX Networks, Inc., San Jose, CA (US)

(72) Inventors: Ratinder Paul Singh Ahuja, Saratoga, CA (US); Manuel Nedbal, Santa Clara, CA (US); Meni Hillel, San Jose, CA (US)

(73) Assignee: ShieldX Networks, Inc., San Jose, CA (US)

( * ) Notice: Subject to any disclaimer, the term of this patent is extended or adjusted under 35 U.S.C. 154(b) by 252 days.

(21) Appl. No.: 15/471,923

(22) Filed: Mar. 28, 2017

(65) Prior Publication Data

US 2018/0288094 A1 Oct. 4, 2018

(51) Int. Cl.
*H04L 29/06* (2006.01)
*H04L 29/08* (2006.01)
*H04L 12/24* (2006.01)

(52) U.S. Cl.
CPC .......... *H04L 63/20* (2013.01); *H04L 41/0893* (2013.01); *H04L 63/1408* (2013.01);
(Continued)

(58) Field of Classification Search
CPC . H04L 63/20; H04L 63/1408; H04L 63/1416; H04L 63/1433; H04L 63/0263; H04L 63/104; H04L 41/0893; H04L 67/30
See application file for complete search history.

(56) References Cited

U.S. PATENT DOCUMENTS 7,215,637 B1 * 5/2007 Ferguson ................ H04L 45/00
370/230.1
7,865,578 B1 * 1/2011 Gerraty ............. H04L 12/40013
709/220

(Continued)

FOREIGN PATENT DOCUMENTS

WO 2016204903 A1 12/2016

OTHER PUBLICATIONS

International Search Report and Written Opinion for Application No. PCT/US2018/024546, dated Jul. 2, 2018, 16 pages.
(Continued)

*Primary Examiner* — Sarah Su
(74) *Attorney, Agent, or Firm* — Nicholson De Vos Webster & Elliott LLP

(57) ABSTRACT

Systems, methods, and apparatuses enable to enable the insertion and configuration of interface microservices at servers or other types of computing devices in a computing environment in response to changes to security policies affecting one or components of the computing environment. In one embodiment, a security application detects servers in a computing environment and generates profile data for the detected servers. The security application assigns detected servers to security policy groups by applying a set of filters to the generated profile data for each server in an order specified by a set of precedence rules. The security policy groups are each associated with one or more security policies that define security rules and other configurations used to provide security services to servers that are members of the corresponding security policy group.

20 Claims, 14 Drawing Sheets

(52) U.S. Cl.
CPC ...... *H04L 63/1416* (2013.01); *H04L 63/1433* (2013.01); *H04L 67/30* (2013.01); *H04L 63/0263* (2013.01); *H04L 63/104* (2013.01)

(56) References Cited

U.S. PATENT DOCUMENTS

| | | | |
|---|---|---|---|
| 9,716,617 B1* | 7/2017 | Ahuja | H04L 67/1031 |
| 10,013,550 B1* | 7/2018 | Ahuja | H04L 67/1008 |
| 10,142,356 B2* | 11/2018 | Ahuja | H04L 45/30 |
| 2002/0091815 A1* | 7/2002 | Anderson | G06Q 10/06 |
| | | | 709/223 |
| 2005/0182756 A1* | 8/2005 | Eppley | G06F 16/9027 |
| 2006/0155863 A1* | 7/2006 | Schmidt | H04L 67/26 |
| | | | 709/229 |
| 2006/0287998 A1* | 12/2006 | Folting | G06F 17/246 |
| 2007/0039044 A1* | 2/2007 | Moonen | H04L 63/0227 |
| | | | 726/13 |
| 2010/0132029 A1* | 5/2010 | Chauhan | H04L 63/0227 |
| | | | 726/12 |
| 2012/0042060 A1* | 2/2012 | Jackowski | H04L 47/2475 |
| | | | 709/224 |
| 2016/0373474 A1* | 12/2016 | Sood | H04L 63/1425 |
| 2018/0027399 A1* | 1/2018 | Seidman | G06K 9/00335 |
| | | | 455/456.1 |
| 2018/0083985 A1* | 3/2018 | Ahuja | H04L 63/1408 |
| 2018/0191680 A1* | 7/2018 | Ahuja | H04L 63/0245 |
| 2018/0260251 A1* | 9/2018 | Beveridge | G06F 9/5027 |

OTHER PUBLICATIONS

Sun Y., et al., "Security-as-a-Service for Microservices-Based Cloud Applications," 7th International Conference on Cloud Computing Technology and Science (Cloudcom), IEEE, Nov. 30, 2015, pp. 50-57.

* cited by examiner

US 10,659,496 B2

INSERTION AND CONFIGURATION OF INTERFACE MICROSERVICES BASED ON SECURITY POLICY CHANGES

TECHNICAL FIELD

Embodiments relate generally to computer network security. More specifically, embodiments relate to techniques for inserting and configuring interface microservices at computer systems in response security policy changes affecting servers hosted by the computer systems.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by their inclusion in this section.

Most businesses and other organizations today rely on computer systems and computer networks for an increasingly wide variety of business operations. As reliance on computing technologies has grown, so too has the importance of securing computer systems and networks against internal and external security threats. However, the breadth and complexity of security threats targeting such computer systems and networks is far and wide and ever growing. To monitor and address these security threats, organizations increasingly rely on sophisticated computer security applications and hardware such as firewalls, anti-virus tools, data loss prevention (DLP) software, etc. However, the expansion of cloud computing services and other non-traditional networked computing environments has increased the complexity of integrating security services into a wide variety of computing environments.

DETAILED DESCRIPTION

Figure 1:
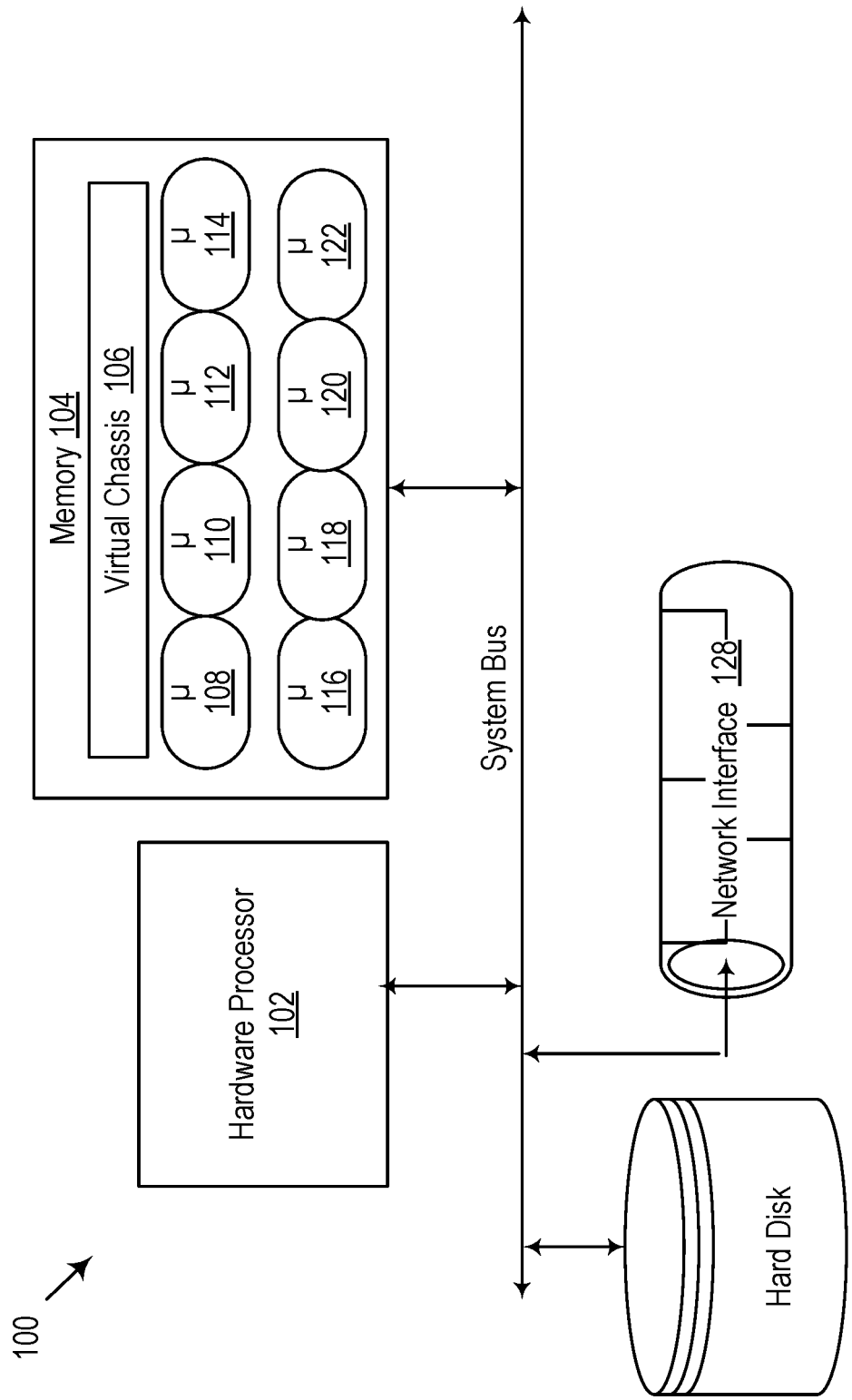
FIG. 1 is a block diagram illustrating computer hardware for loading network security system microservices from a memory and executing them by a processor in accordance with the disclosed embodiments.

In the following description, for the purposes of explanation, numerous specific details are set forth in order to provide a thorough understanding of embodiments of the present invention. It will be apparent, however, that embodiments of the present invention may be practiced without these specific details. In other instances, well-known structures and devices are shown in block diagram form to avoid unnecessarily obscuring embodiments of the present invention.

References in the specification to "one embodiment," "an embodiment," "an example embodiment," etc., indicate that the embodiment described may include a particular feature, structure, or characteristic, but every embodiment need not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

Embodiments are described herein according to the following outline:

1.0. General Overview
2.0. Operating Environment
 2.1. System Overview
 2.2. Adding Microservices to a Computing Environment
 2.3. Generating Server Profile Data
 2.4. Security Policies
3.0. Functional Overview
4.0. Example Embodiments
5.0. Implementation Mechanism—Hardware Overview
6.0. Extensions and Alternatives

1.0. General Overview

Modern data centers and other computing environments can include anywhere from a few computer systems to thousands of systems configured to process data, service requests from remote clients and other applications, and perform numerous other computational tasks. The large number of interworking systems, applications, etc., make such computing environments susceptible to a wide variety of network security threats and other issues. A number of network security tools are available to protect such systems and the computer networks interconnecting these systems, and many of these tools comprise a monolithic set of network security functions. For example, a typical network security tool might comprise a hardware unit including firewall services, routing services, virtual private network (VPN) services, and so forth.

The type of network security tool described above is useful for providing a variety of network security functions as a single unit. However, efficiently scaling these types of network security tools is often challenging. For example, if a particular computer environment might benefit from increased firewall resources, a system administrator may install one or more additional hardware units each including firewall services in addition to a suite of other network security functions. While the addition of these new hardware units may meet the increased firewall resource needs, some of the hardware units may include unnecessary or underutilized resources devoted to virtual private network (VPN) services, data loss prevention (DLP) services, or other security services.

One way in which many modern computing environments scale resources more efficiently is using virtualized computing resources. A virtualized computing resource generally refers to an abstracted physical computing resource presented to an operating system and its applications by means of a hypervisor, such that the virtual computing resources (compute, memory, network connectivity, storage, etc.) are configurable and may be different from those of the physical computing resource. According to one embodiment, these types of virtualized infrastructures are used to efficiently scale network security applications based on the use of "microservices," where a microservice is a particular type of virtualized computing resource packaged as a software container. For example, a network security platform may comprise separate microservices providing firewall resources, DLP services, VPN services, etc. In general, the use of such microservices can provide greater flexibility because the microservices can be more easily deployed and scaled in response to variable demands for various types of network security services.

The type of efficient network security application scaling described above can be achieved with the use of a security application that is configured to scale network security services using microservices. Although many of the techniques described herein are explained with reference to a microservice-based network security application, the techniques are also applicable to other types of network security systems.

2.0. Operating Environment

2.1. System Overview

FIG. 1 is a block diagram illustrating an embodiment of a scalable microservice architecture using microservices. Network security system microservices 108-122 are stored in memory 104 (e.g., volatile memory such as Random Access Memory (RAM) or non-volatile memory such as disk) and executed by one or more hardware processors or processor cores 102. Network security system microservices 108-122, consisting of computer-executable instructions to perform one or more specific security services, are deployed based on configuration across available physical servers. Typically, each microservice receives a configuration and tasks via a backplane of a virtual chassis 106, and returns status, statistics, and other information to the backplane.

The data processed by the network security system 100 is transferred from a microservice to another (higher hierarchy) microservice using a data plane. In some embodiments, during such a transfer, a lower microservice decides (based on configuration, current statistics, and other information) as to which next microservice to utilize. Such a decision may constitute a load-balancing decision to assure that the higher-hierarchy microservices are efficiently utilized. In other embodiments, the decision of which microservice to utilize is made by a more central entity.

As illustrated, a network security system 100 utilizes a hardware processor 102 (such as a central processing unit (CPU) or one or more cores thereof, a graphics processing unit (GPU) or one or more cores thereof, or an accelerated processing unit (APU) or one or more cores thereof) to execute microservices stored in memory 104. A network interface 128 (e.g., fabric or interconnect that is wired or wireless) provides a means for communicating with a data center. Network security system 100 may inspect traffic, detect threats, and otherwise protects a data center using the microservices 108-122.

Embodiments of a network security system 100 providing the above capabilities are now discussed in more detail. Network security system 100 adds security to, or enhances the security of, a datacenter or other computing environment. In an embodiment, network security system 100 is delivered (e.g., downloaded) in the form of a seed software application. The seed software application instantiates microservices of the network security system on a host in the datacenter. As used herein, a microservice container refers to where the microservice runs, for example, on a virtual machine. Once deployed, network security system 100 utilizes a hardware processor 102, memory 104, and network interface 128. In many scenarios, security can be added/configured using existing hardware and without purchasing additional rack devices for particular functionality. The seed software application may be installed on any one of a wide variety of hosts—be they slow or fast, low-cost or high-cost, commodity or customized, geographically dispersed, part of a redundancy scheme, or part of a system with regular back-ups.

In some embodiments, a network security system 100 utilizes a network interface 128 to explore the datacenter and to discover existing network segments, determine security settings to apply to various network segments, detect available hosts and hardware resources, and determine additional configuration information as needed. In an embodiment, the datacenter itself includes several machines with hypervisors, or physical hardware, and the network security system 100 offers microservices to communicate with and protect one or more of those internal virtual machines or physical hardware. Based on performing datacenter discovery, a network security system 100, in some embodiments, may then offer or suggest available security tools for selection either through a graphical interface or via connections with existing enterprise management software. In one embodiment, once configured, a network security system 100 is deployed "in-line," receiving packets headed for the datacenter, thereby allowing network security system to intercept and block suspicious traffic before it reaches the datacenter. With an understanding of the datacenter, a network security system 100 deploys microservices to inspect traffic throughout the datacenter, and not only at ingress. In some embodiments, a network security system 100 is deployed in a "copy only" configuration, in which the system monitors traffic, detects threats, and generates alerts, but does not intercept traffic before it arrives at the datacenter.

As shown, memory 104 has stored therein microservices 108, 110, 112, 114, 116, 118, 120, and 122 (108-122), as well as a virtual chassis 106, which is also a microservice. In an embodiment, the microservices are small in size, consisting of a relatively small number of instructions. In an embodiment, the microservices 108-122 are independent of each other. As illustrated, microservices 108-122 are microservices that are loaded from memory and executed by the hardware processor 102. Those microservices 108-122 include data path security microservices, for example TCP/IP, SSL, DPI, or DLP microservices, as described further below with respect to FIGS. 2 and 3. The microservices 108-122 may also include management microservices, for example, a chassis controller to manage the microservices, a configuration microservice, an infrastructure discovery microservice, a database microservice to store data, a policy update microservice to receive policy updates from an external security cloud, and a compiler to receive policy data from various sources and to produce binary policy outputs to be used by the microservices, to name a few examples that are described hereinafter with respect to FIGS. 2 and 3.

In an embodiment, a network security system 100 receives traffic via network interface 128 to/from a datacenter. In one embodiment, a network security system 100 is placed in-line to inspect traffic, and potentially intercept a threat before it arrives at, or leaves, the datacenter. In other embodiments, a network security system 100 monitors the traffic heading into, or out of, the datacenter, in which case the network security system 100 detects threats and generates alerts, but does not block the data. A hardware processor 102 may execute various data security microservices on the data. For example, as described hereinafter with respect to FIGS. 2 and 3, typically traffic first passes into and through a segment microservice, then a TCP/IP inspection microservice, then a SSL microservice, then a DPI microservice, then a NOX microservice, and then a DLP microservice. However, one or more of these services may not be enabled. In some embodiments, a segment microservice resides within a network segment and serves as the entry point for data packets and forwards the packets to appropriate microservices for further analysis. Data path microservices as used herein refer to various microservices that inspect and analyze network traffic, such as TCP, TLS, DPI, NOX, and DLP microservices. A TCP microservice, for example, refers to a packet handling microservice able to process any layer 4-6 network packet and includes part of firewalling. A TLS microservice, for example, refers to a Transport Layer Security microservice, which decrypts/re-encrypts connections. A DPI microservice, for example, refers to a Deep Packet Inspection microservice and handles layer 7 inspection. A NOX microservice, for example, refers to a Network Object Extractor microservice, and works in conjunction with DPI to assemble objects from individual packets and to deliver the objects to other services. A DLP microservice, for example, refers to a Data Loss Prevention microservice, which detects and attempts to prevent data loss. Control path microservices, on the other hand, are various microservices, such as a factory, a compiler, a configuration, an infrastructure discovery, a database, a messenger, a scaler, and a chassis controller, that are instantiated in, and make up, a management plane. Threats detected by the aforementioned microservices, in one embodiment, are reported to a chassis controller microservice, which takes remedial action.

In an embodiment, microservices 108-122 are implemented using computer-executable instructions loaded from the Internet via network interface 128. For instance, in an embodiment, the microservices are implemented with computer-executable instructions downloaded from a web site or online store site. In some embodiments, microservices 108-122 are loaded into memory 104. In various embodiments, the microservices are implemented using computer-executable instructions loaded on and received from a non-transitory computer readable medium, such as digital media, including another disc drive, a CD, a CDROM, a DVD, a USB flash drives, a Flash memory, a Secure Digital (SD) memory card, a memory card, without limitation. Microservices received from a digital medium may be stored into memory 104. The embodiments are not limited in this context. In further embodiments, a digital medium is a data source that constitutes a combination of hardware elements such as a processor and memory.

In most embodiments, a network security system 100 runs on a datacenter computer. In other embodiments, however, a network security system 100 is installed and runs on any one of a wide variety of computing platforms, ranging from low-cost to high-cost, and from low-power to high power. In some embodiments, a network security system 100 runs on a server. In some embodiments, a network security system 100 is installed on and runs on a low-cost, commodity server computer, or on a low-cost rack-mounted server. As illustrated, hardware processor 102 is a single core processor. In alternate embodiments, hardware processor 102 is a multi-core processor. In alternate embodiments, hardware processor 102 is a massively parallel processor. In some embodiments, a virtual chassis 106 and microservices 108-122 may be hosted on any of a wide variety of hardware platforms used in the datacenter to be protected.

In some embodiments, a network security system 100 scales out using available resources to accommodate higher traffic or load. In one embodiment, hardware processor 102 (CPU) and memory 104 are scaled out or in dynamically as needed: additional CPUs and memory are added if scaling out, and some CPUs, memory, or both, are powered down if scaling in. This scaling out is performed to allocate the additional CPUs and memory to those portions of the security hierarchy for which there is demand, while not allocating additional CPUs and memory to those portions of the security hierarchy that can accommodate the higher traffic utilizing their existing allocation.

One property of a microservice is the separation and protection of memory from other microservices. In this manner, an individual microservice may be moved to another physical server or terminate abnormally without impacting other microservices. Microservices may be distinguished from threads in that threads generally operate within a shared memory space and exist within the confines of an operating system on which the microservices were spawned.

Figure 2:
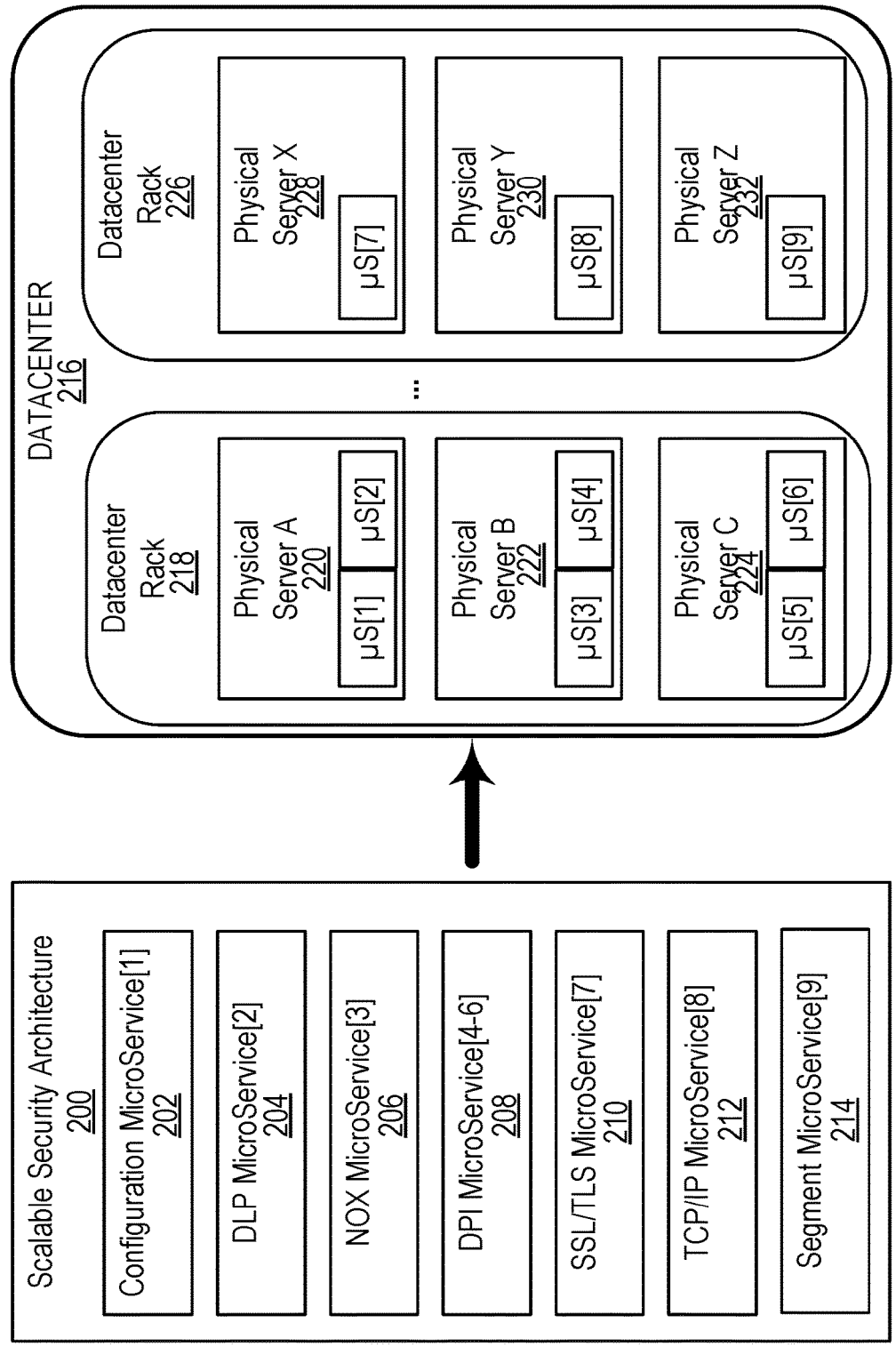
FIG. 2 illustrates a scalable security architecture implementing a three-time scale out using security microservices in accordance with the disclosed embodiments.

FIG. 2 illustrates an example scalable security architecture implementing a three-time scale out using security microservices. In the example of FIG. 2, only a single microservice (e.g., a DPI microservice) has a demand for additional resources. As shown, by utilizing a scalable microservice architecture 200, including DLP microservice 204, NOX microservice 206, DPI microservice 208, SSL/TLS microservice 210, TCP/IP microservice 212, and segment microservice 214, each layer of the security service hierarchy can be scaled and configured independently to load balance the supply of processed data to the next hierarchy level. As shown, datacenter 216 includes datacenter rack 218, which includes physical server A 220, physical server B 222, and physical server C 224. As shown, a datacenter rack 226 includes physical server X 228, physical server Y 230, and physical server Z 232. DPI microservices 208 have been scaled out 3×, and in this instance assigned to be performed as microservices 4-to-6 on physical server B 222 and physical server C 224. The remaining microservices of scalable security architecture are shown as being implemented by physical servers A, X, Y, and Z (220, 228, 230, and 232, respectively). A configuration microservice 202 creates a configuration backplane and a data plane deployed as a software component on each physical server that is to receive security services. This process includes configuring routing rules, reserving network address space (such as a subnet), and configuring virtual environments to utilize portions of the reserved address space as gateways for network communication in and out of the servers to be secured. Both the backplane and data plane may thus be considered virtual networks managed by the security system. Security microservices may then utilize these networks to transmit packets, content, state, and other information among the microservices. The properties of the backplane and data plane are configured to reject packet traffic from outside the security system and to route information between microservices regardless of the physical server and virtual environment configuration.

Figure 3:
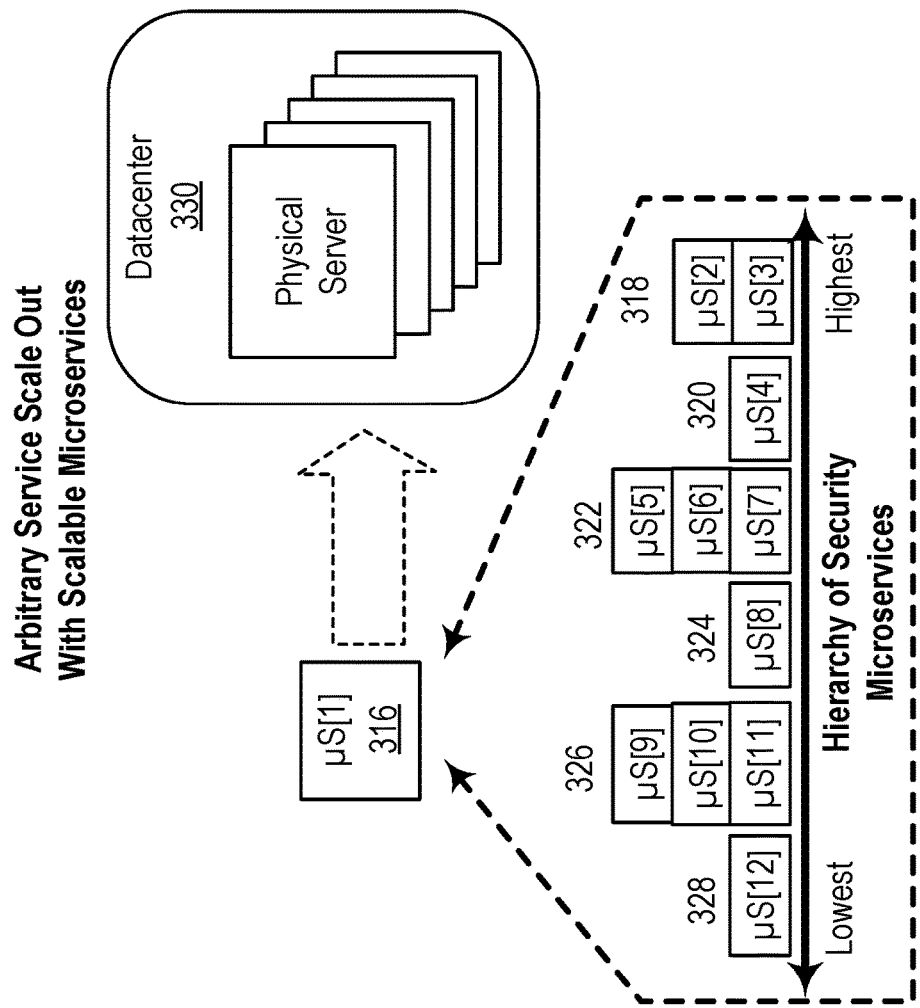
FIG. 3 illustrates an arbitrary scaling out of a microservice in accordance with the disclosed embodiments.

FIG. 3 illustrates an arbitrary scaling out of a microservice according to an embodiment. As shown, scalable security architecture 300 includes configuration microservice 302, DLP (2×) microservice 304 (a 2-times scale-out), NOX microservice 306, DPI (3×) microservice 308 (a 3-times scale-out), SSL/TLS microservice 310, TCP/IP (3×) microservice 312 (a 3-times scale-out), and segment microservice 314. As shown, configuration microservice 316 provisions (318, 320, 322, 324, 326, and 328) the 11 microservices from a lowest hierarchy to a highest hierarchy, and configures them to communicate with each other via a backplane. The microservices, for example, may be implemented by physical servers in datacenter 330.

Figure 4:
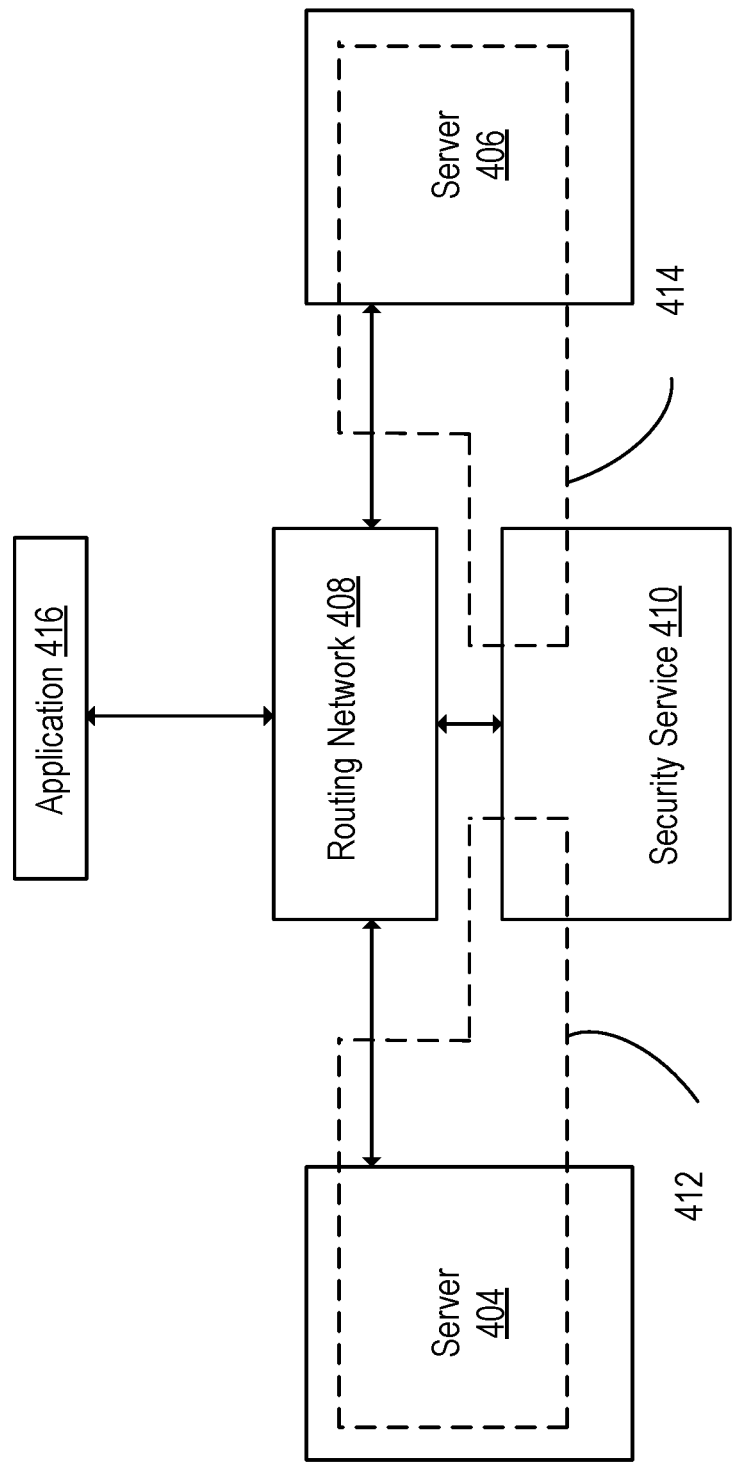
FIG. 4 is a block diagram illustrating a security service configured to monitor traffic sent among an application and one or more servers through a routing network in accordance with the disclosed embodiments.

FIG. 4 is a block diagram illustrating a networked computing environment in which an embodiment may be implemented. FIG. 4 represents an example embodiment that is provided for purposes of illustrating a clear example; other embodiments may use different arrangements.

The networked computer system depicted in FIG. 4 comprises one or more computing devices. These one or more computing devices comprise any combination of hardware and software configured to implement the various logical components described herein. For example, the one or more computing devices may include one or more memories storing instructions for implementing the various components described herein, one or more hardware processors configured to execute the instructions stored in the one or more memories, and various data repositories in the one or more memories for storing data structures utilized and manipulated by the various components.

In one embodiment, one or more security services 410 may be configured to monitor network traffic and other data sent between an application 416 and one or more servers 404, 406 through a routing network 408. The security service 410 comprises one or more "microservices" used to monitor and perform various actions relative to data items (e.g. network traffic, files, email messages, etc.) sent to and received from one or more applications 416 and servers 404, 406. The microservices comprising security service 410 may not be confined to one physical server such as a server 404, 406. For example, one or more microservices of the security service 410 may be executed on server 404, and other microservices of the security service 410 may be executed on server 406. In some embodiments, the security service 410 is executed on a different server from one or more servers for which the security service is responsible for monitoring and protecting.

In an embodiment, a routing network 408 provides connectivity among servers 404, 406, security service 410, and application 416. In some embodiments, routing network 408 is partially configured responsive to hypervisor configuration of servers 404 and 406. In some embodiments, a routing network 408 is partially or entirely configured responsive to hypervisor configuration of servers 404 and/or 406.

In one embodiment, based on routing information included in channel data encapsulation packets, data traveling between an application 416 and server 404 and server 406 is routed to the correct server, and is kept separate from data traveling between the application 416 and the other server. Accordingly, what is essentially a private network 412 may be created between the server running security service 410 and server 404. Similarly, what is essentially a private network 414 may be created between the server running security service 410 and server 406.

Figure 5:
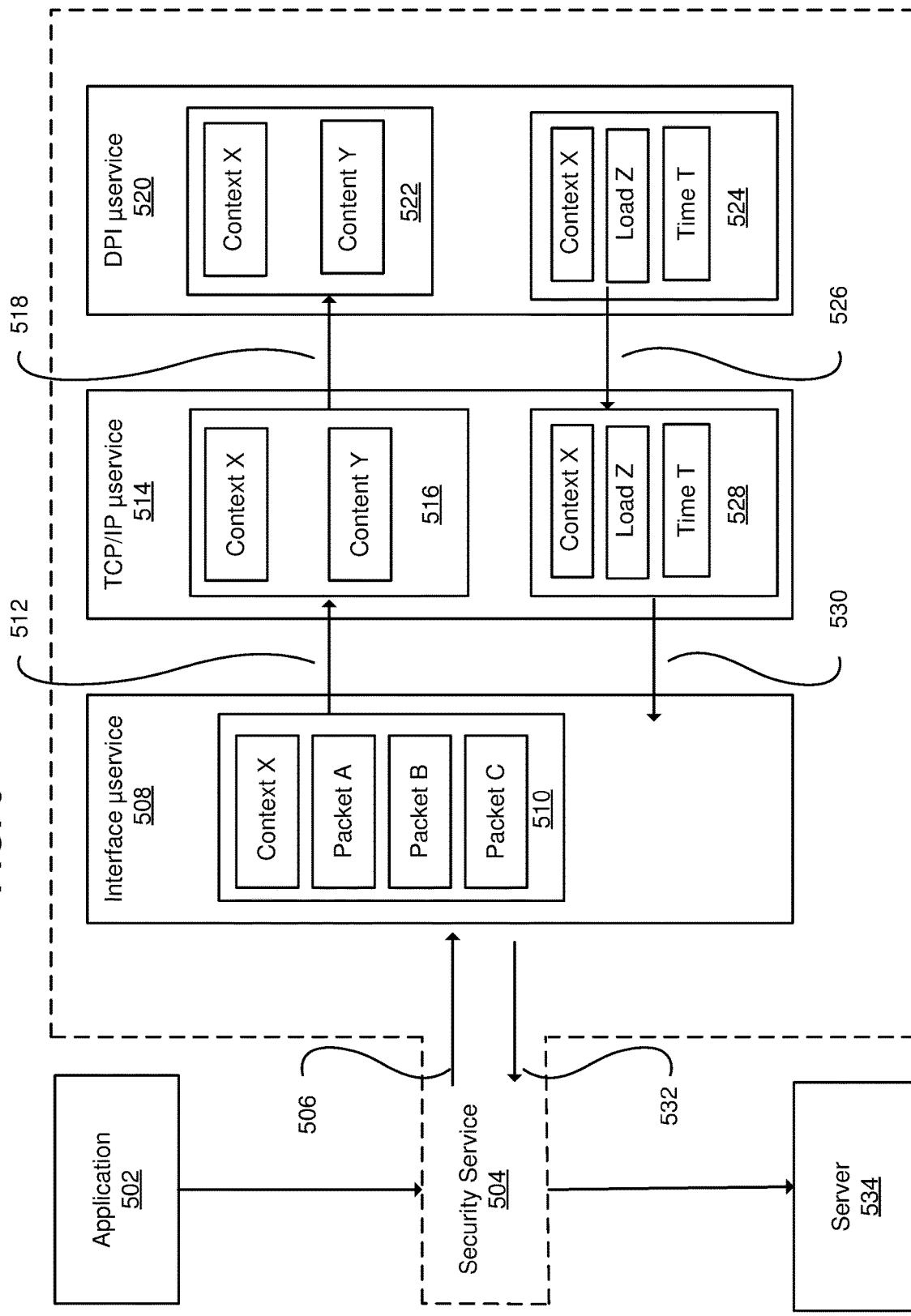
FIG. 5 is a block flow diagram illustrating application data traversing to a server after passing through a hierarchy of a security microservices in accordance with the disclosed embodiments.

FIG. 5 is a block flow diagram illustrating application data traversing to a server after passing through a hierarchy of a security microservices according to an embodiment. As illustrated, the flow begins with security service 504 receiving a network data packet from application 502. Security service 504 forwards 506 the packet to interface microservice 508, which generates a channel data encapsulation packet 510 encapsulating three packets A, B, and C, and a context X. As shown, channel data encapsulation packet 510 encapsulates three packets, but in alternate embodiments, the number of encapsulated packets may vary without limitation. In some embodiments, context X is generated based at least on the headers of packets A, B, and C. In some embodiments, context X is generated based on a lookup of packet header fields such as IP addresses, ports, and MAC addresses for the source and destination of the packets. In some embodiments, the generation of context X includes using an interface identifier obtained from a virtualization environment. Generation of context X may be accomplished through a lookup of header fields and other data in a table, a hash of header fields and other data, or another method whereby packets for which a common security policy is to be applied are associated with a common context or common portion, such as a bit field, of the context.

Context X may be considered an identifier describing the traffic streams, source machines, or applications responsible for generating packets A, B and C. This identifier may be direct (such as an ID used as a table look up), indirect (such as a pointer used to access a data structure), or some other method of instructing microservices as to the policies and processing to use for handling packets A, B, and C. As an example, context X may be generated by performing a hash, longest prefix match, or lookup of header fields such as IP addresses, TCP ports, interface names (or MAC addresses), or other packet properties. The lookup may be an exact match, longest prefix match, or other method to associate packet streams with the same security processing to use. The generated context may then be used by security services, such as a DPI service, to determine which rules to utilize when scanning the data from packets A, B, and C (and other packets that are part of the same traffic stream). This information may be embedded within the context (as a bit field or other information), available by indirection (such as a table or data structure lookup by another service), or generated programmatically based on any combination of such information.

The context may be generated through a look up at an interface microservice and is included in the transmission of packet data to transmission control protocol (TCP) reassembly services. Reassembled content from the TCP microservice is transmitted to a deep packet inspection (DPI) microservice or secure socket layer (SSL) microservice, and with the same context. By maintaining this context in the encapsulation of data transport throughout the microservice hierarchy, processing directives associated with a context become a shared read-only resource (relative to the microservices) and may only rarely use stateful updates.

Interface microservice 508 transmits 512 the channel data encapsulation packet 510 to TCP/IP microservice 514. As shown, the channel data encapsulation packet 516 includes context X and content Y, which corresponds to packets A, B, and C of channel data encapsulation packet 510. After conducting security processing of the channel data encapsulation packet 516, TCP/IP microservice 514 transmits 518 the packet to DPI microservice 520. As shown, the channel data encapsulation packet 522 includes context X and content Y, which corresponds to packets A, B, and C of channel data encapsulation packet 510. After conducting security processing of the channel data encapsulation packet 522, DPI microservice 520 generates channel data encapsulation packet 24, which, as shown, includes context X, DPI load Z, and DPI timestamp T. Encapsulated channel data may be tagged with properties including a timestamp and a load metric. The timestamp may reference the duration of microservice processing, the time at which microservice processing started or another temporal property associated with processing the encapsulated channel data. The load metric may reference the relative or absolute loading of a microservice processing the encapsulated channel data.

As shown, a DPI microservice 520 transmits, via path 526, channel data encapsulation packet 524 to TCP/IP microservice 514, which uses the DPI load and DPI timestamp information to inform future load-balancing decisions. As shown, a TCP/IP microservice 514 generates channel data encapsulation packet 528, which includes context X, TCP/IP load Z, and TCP/IP timestamp T. As shown, TCP/IP microservice 514 transmits, via path 530, channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits the packets to a server 534.

As shown, DPI microservice 520 transmits channel data encapsulation packet 524 to TCP/IP microservice 514, which uses the DPI load and DPI timestamp information to inform future load-balancing decisions. As shown, TCP/IP microservice 514 generates channel data encapsulation packet 528, which includes context X, TCP/IP load Z, and TCP/IP timestamp T. As shown, TCP/IP microservice 514 transmits channel data encapsulation packet 528 to interface microservice 508, which uses the TCP/IP load and TCP/IP timestamp information to inform future load-balancing decisions. The flow is completed when interface microservice 508 transmits, via path 532, packets to security service 504, which transmits them to server 534 microservice.

Exemplary benefits of the security service 504 may include the ability of each microservice to utilize the same channel data encapsulation protocol for all communication, thereby allowing scaling across the entirety of the datacenter network routable via the channel data encapsulation header. Communications between microservices maintain a context X generated at interface microservice 508 to all subsequent microservices that no longer have access to the original packets. As an example, a DPI microservice processing content reassembled by a TCP/IP microservice has no visibility into the packets used by the TCP/IP microservice to reassemble the content. However, the context X generated upon reception of one or more of those packets at the interface microservice, forwarded to the TCP/IP microservice and subsequently forwarded by the TCP/IP microservice to the DPI microservice, may be used to determine policy or select a minimal DPI signature set by the DPI microservice without incurring additional state processing. By providing load and timestamp data in the channel data encapsulation packets 524 and 528, which are returned via paths 526 and 530, the microservices receive and can maintain real-time loading and processing latency information utilized to make load balancing decisions.

Figure 6:
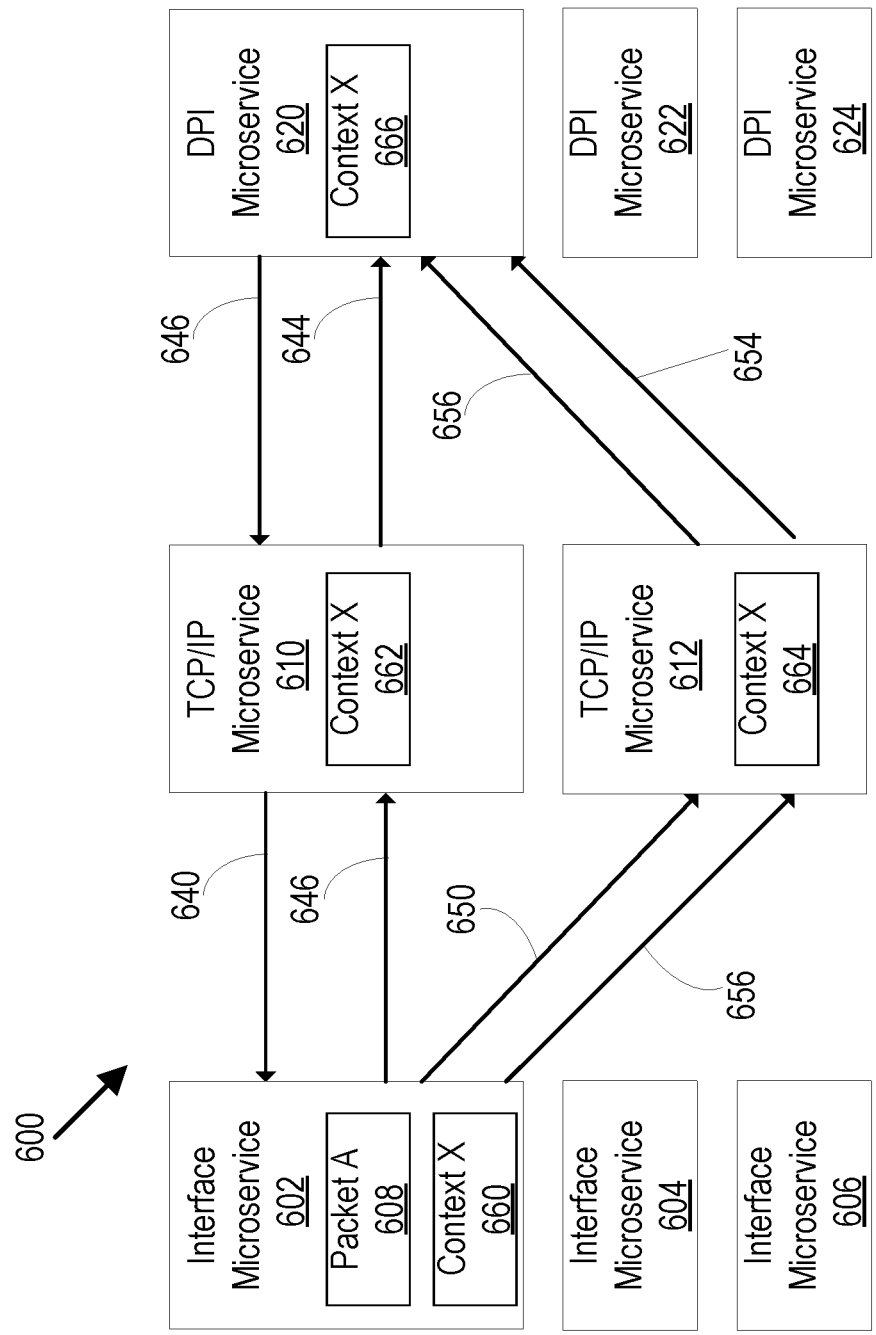
FIG. 6 is a flow of application data through a stateless processing, fault-tolerant microservice environment in accordance with the disclosed embodiments.

FIG. 6 is a block diagram illustrating a flow of application data through a stateless processing, fault-tolerant microservice environment in accordance with disclosed embodiments. As illustrated, security system 600 includes interface microservices 602, 604, and 606, TCP/IP microservices 610 and 612, and DPI microservices 620, 622, and 624. Other examples include a different number of microservices, different types microservice types, or both. In the example of FIG. 6, an interface microservice 602 receives packet A 608, and generates a context X 660.

One benefit of the security system illustrated in FIG. 6 is the handling of state. For example, if packets belong to a certain context X, the security system 600 may enable both TCP/IP microservices 610 and 612 to perform meaningful work on the packets. By implementing TCP/IP processing as microservices 610 and 612 with an external state structure and a context that accompanies processed data, each TCP/IP microservice, and any other microservice at every level of the security hierarchy, can be isolated from other microservices and can be scaled independently. Each microservice can access the state for any packet or reassembled packet data, thereby enabling real-time load balancing. In many cases, the context enables microservices to forego consulting service state (state associated with processing at the hierarchy level of the specific microservice), thereby reducing the demands on the global state repository.

As an example, consider the context X 662 obtained by TCP/IP microservice 610 as part of packets received from interface microservice 602 as transmission 646. Context X 662, when transmitted to DPI microservice 620 as part of transmission 644, along with the reassembled packet data, contains information that may enable the DPI microservice to forego or simplify processing of this reassembled data. Such information can include, for example, a context bit or field specifying a subset of regular expressions or patterns to be used for DPI processing, a number of bytes of reassembled data to be received before beginning DPI processing, specific allowed or disallowed protocols, and other information potentially avoiding a DPI state lookup.

In an embodiment, microservices of a security system 600 are stateless. For example, each of the microservices may retrieve state information from an outside source such that the microservice can process packets or content belonging to any context. Each microservice may retrieve and update service state (that state associated with the microservice processing). Additionally, each microservice may retrieve and update context state (state associated with the context relevant for all security service processing). In some embodiments, the process state and context state share a global state service. Examples of elements of context state include a level of suspicion regarding traffic from a source IP, a policy to ignore certain ports or protocols, and other information used to process the packets, reassembled content, and extracted objects from communication identified with the context.

In an embodiment, multiple microservices in the same or different hierarchy of the security system may be able to process packets associated with the same context at the same time. If one security microservice fails (e.g., if a TCP microservice fails to respond to a request), another microservice can take over and process the request using the failed microservice's context.

Returning to FIG. 6, the generation of context X 660 may include considering properties associated with a packet A 608 (e.g., such as an n-tuple detailing routing information), and also a state lookup or a context lookup, in addition to other information. Interface microservice 602 provides packet A 608 and context X 660 to TCP/IP microservice 610 or 612 via path 640 or 650, respectively. For example, interface microservice 602 may conduct a load-balancing to select one of the TCP/IP microservices to forward the packet A 608 and the context X 660.

In an embodiment, TCP/IP microservices 610 and 612 are stateless, but may benefit from the context X generation performed by interface microservice 602. For example, whichever of TCP/IP microservices 610 and 612 receives packet A may disassemble the packet to extract the data associated with the packet and conduct security processing on the data. TCP/IP reassembly generally consists of associating packets with flows (e.g., identified by source and destination IP and port values) and using the TCP sequence numbering to place the packets into a correct order, remove any overlap or duplication, and/or identify missing or out of order packets.

In FIG. 6, TCP/IP microservices 610 or 612 forward the extracted data or the data resulting from the security processing to DPI microservice 620 via paths 644 or 656, respectively. Along with the transmitted data, TCP/IP microservice 610 or 612 forwards context X 662 or 664, respectively, to a DPI microservice 620. In some embodiments, context X 660, 662, 664, and 666 are substantially identical.

In an embodiment, DPI microservice 620 is also stateless and may use the context provided by TCP/IP microservice 610 or 612 in transmission 644 or 656. DPI microservice 620 may load DPI processing state before processing the received data, but can perform some work (e.g., scheduling different DPI pattern state tables) based on the context. Transmitting the context to the DPI microservice therefore may obviate some amount of work by the DPI microservice. If TCP/IP microservice 610 fails and interface microservice 602 instead utilizes TCP/IP microservice 612, DPI microservice 620 may obtain the context from the transmission of reassembled TCP content in transmission 656.

Although FIG. 6 does not show a second packet, when a subsequent packet associated with the same context is received, interface microservice 602 may conduct a load balancing and select one of the TCP/IP microservices to forward the packet along with context X 660. In one embodiment, interface microservice 602 chooses to forward the second packet to TCP/IP microservice 612 via path 650. TCP/IP microservice 612 performs some security processing, then transmits the second packet and context X 664 to DPI microservice 620 via path 654. After performing some security processing, DPI microservice 620 responds to TCP/IP microservice 612 via path 654, and TCP/IP microservice responds to interface microservice 602 via path 656.

Summarizing the operation of an embodiment as illustrated by FIG. 6, an interface microservice transmits packets to a TCP/IP microservice along with a context that has been generated based on the contents of the packets. The transmission comprises a request to perform a security service (e.g., TCP/IP reassembly) for the packets to generate reassembled data. The TCP/IP microservice consults the received context to determine whether to obtain a context state, service state, or both, from a state repository to perform the security service. Reassembly is performed by the TCP/IP microservice, any modified state returned to the state repository and the reassembled data transmitted, along with the context, to a DPI microservice as a request to perform DPI processing.

Continuing the example illustrated by FIG. 6, the DPI microservice receives the reassembled data and context from the request to perform DPI security services transmitted by the TCP/IP microservice. The DPI microservice consults the received context to determine whether to obtain a context state, service state, or both, from a state repository to perform its security service. DPI inspection may be performed by the DPI microservice, any modified state returned to the state repository, and a response sent to the TCP/IP microservice.

2.2. Adding Microservices to a Computing Environment

Figure 7:
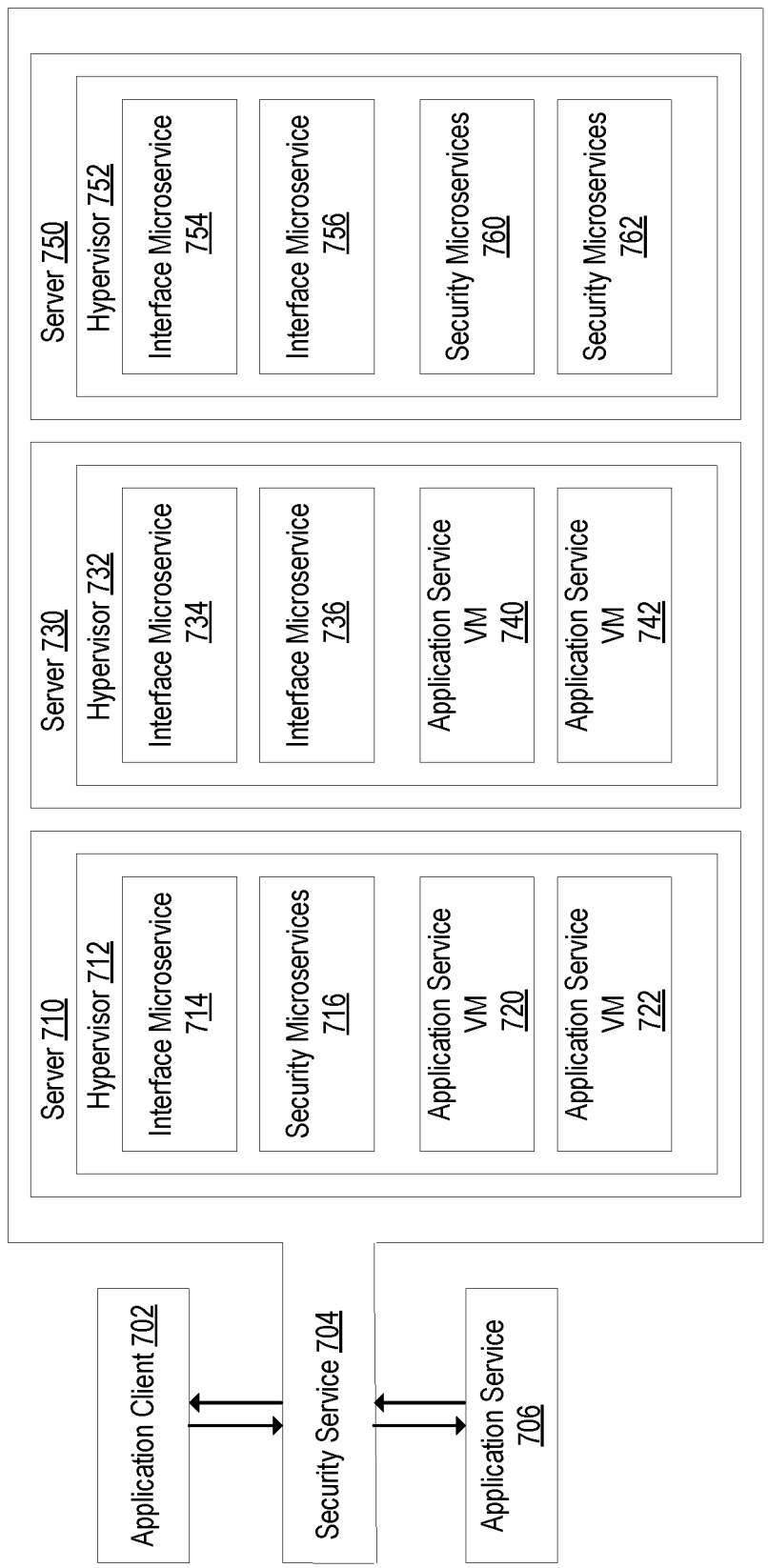
FIG. 7 is a block diagram illustrating example components of a security service in accordance with the disclosed embodiments.

FIG. 7 is a block diagram illustrating example components of a security service 704. The security service 704 may be present between an application client 702 and an application service 706, and may handle requests between the application client 702 and the application service 706, including the transmission of data between the application client 702 and the application service 706.

In one embodiment, the security service 704 comprises multiple servers 710, 730, and 750, each of which further comprises a hypervisor 712, 732, and 752, respectively. The hypervisors 712, 732, and 752 provide hardware abstraction to a virtual machine. For example, the security service 704 may correspond to the security service 710 depicted in FIG. 4. FIG. 7 represents an example embodiment that is provided for purposes of illustrating a clear example; other embodiments may use different arrangements.

Each hypervisor 712, 732, and 752 may have one or more microservices running with security service 704. As depicted in FIG. 7, the hypervisor 712 in server 710 includes an interface microservice 714, security microservices 716, and application service VMs 720 and 722. Similarly, the hypervisor 732 in server 710 includes interface microservices 734 and 736, and application service VMs 740 and 742, and the hypervisor 752 in server 710 includes interface microservices 754 and 756, and security microservices 760 and 762. For hypervisor 732, the security microservice that provides security for application service VMs 740 and 742 may be placed on a different server (e.g., 710 or 750). In embodiments, each of hypervisors 712 includes at least one interface microservice. In the embodiment shown in FIG. 7, the application microservice VM 720, 722, 740, and 742 share the same physical servers as the security microservices 716, 760, and 762, providing the security services. The interface microservices 714, for example, may act as a hook into corresponding hypervisor 712, to obtain packet access, such that any data passing through the hypervisor within the server 710 is presented to an information microservice.

In some embodiments, security service 704 forwards packets received from the application client 702 and the application service 706 to an appropriate interface microservice within one of the multiple servers, which can generate a channel data encapsulation packet that is then sent to the appropriate security microservice or application service VM.

Figure 8:
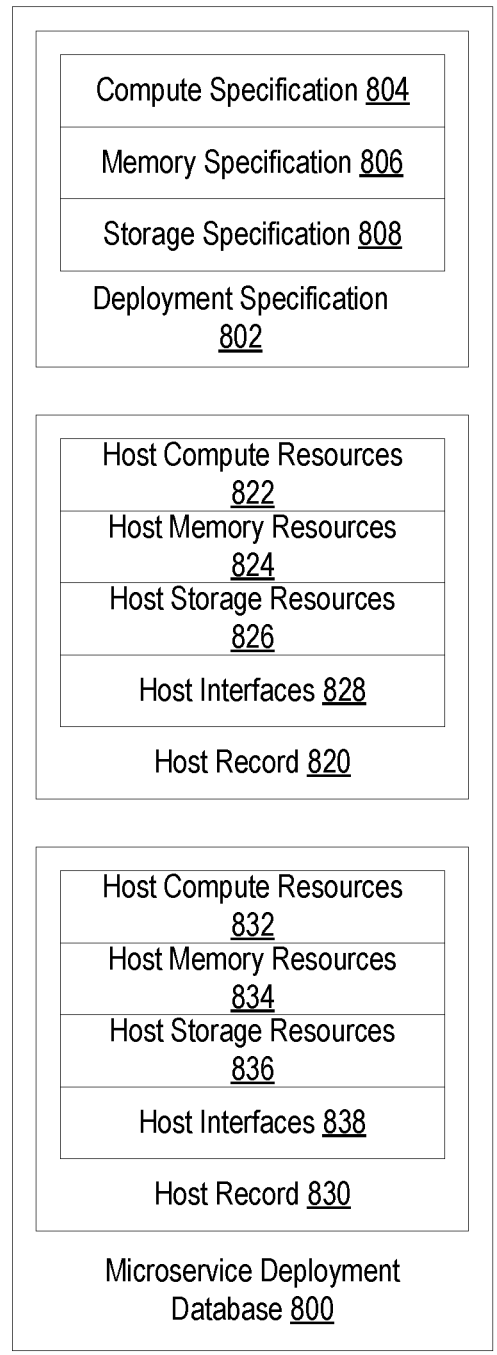
FIG. 8 is a block diagram illustrating a deployment database according to an embodiment.

FIG. 8 illustrates a microservice deployment database 800 according to an embodiment. In some embodiments, the microservice deployment database 800 is an information store that stores information regarding the current infrastructure of a networked environment 402, such as the one depicted in FIG. 4. In the embodiment depicted in FIG. 8, the microservice deployment database 800 includes a deployment specification 802 and host records 820 and 830. In other embodiments, the microservice deployment database 800 may include a greater or fewer number of deployment specifications and host records. In embodiments, the number of host records in the deployment database 800 is dependent upon the number of hosts (e.g., servers) in the networked environment 402.

In the embodiment depicted in FIG. 8, the deployment specification 802 includes a compute specification 804, a memory specification 806, and a storage specification 808, provides specifications for microservices. The deployment specification 802 is stored in the microservice deployment database 800 when the microservice deployment factory receives a request to add a security microservice. Host record 820 includes host compute resources 822, host memory resources 824, host storage resources 826, and host interfaces 828. Similarly, host record 830 includes host compute resources 832, host memory resources 834, host storage resources 836, and host interfaces 838. Host records 820 and 830 provide resource availability information for hosts (e.g., servers).

In one embodiment, a TCP/IP microservice may have a deployment specification indicating that the TCP/IP microservice, when deployed, requires X amount of compute, Y amount of memory, and Z amount of storage. In some embodiments, the deployment specification indicates that optimal performance can be achieved if a TCP/IP microservice is provisioned with at least X amount of compute, Y amount of memory, and Z amount of storage. In some embodiments, the deployment specification indicates that optimal performance was historically achieved when a TCP/IP microservice was initially provisioned X amount of compute, Y amount of memory, and Z amount of storage. Each microservice may have a different specification, where each specification may vary based on various factors. For example, certain microservices may require more memory than other microservices, another microservice that logs events may require more storage, while other microservices may require a different combination of compute, memory, and storage.

In one embodiment, the deployment specification for a microservice is modified based on an analysis of existing microservices. For example, given a deployment specification for a TCP/IP microservice requiring C units of compute and M units of memory, the system may identify that the existing TCP/IP microservices do not experience issues with memory, indicating that the amount of memory request may be reduced. In such an example, the system may modify the deployment specification for the TCP/IP microservice by reducing the amount of units of memory specified in the deployment specification.

The host interfaces 828 and 838 indicate how many existing interface microservices, if any, are present in the corresponding hosts 820 and 830, respectively. Where a host interface indicates that the corresponding host does not have an existing interface microservice, a new interface microservice may need to be initialized on the host. Where the host interface indicates that the corresponding hosts has existing interface microservices, the number of existing interface microservices can be used to determine whether additional interface microservices should be initialized. As interface microservices can tax or strain a hypervisor, the number of interface microservices can be used to determine if the hypervisor can handle additional interface microservices. Using the deployment specification 802 for a microservice and host records 820 and 830, the system can determine the suitable host for deployment of the microservice by the deployment factory 422.

Figure 9:
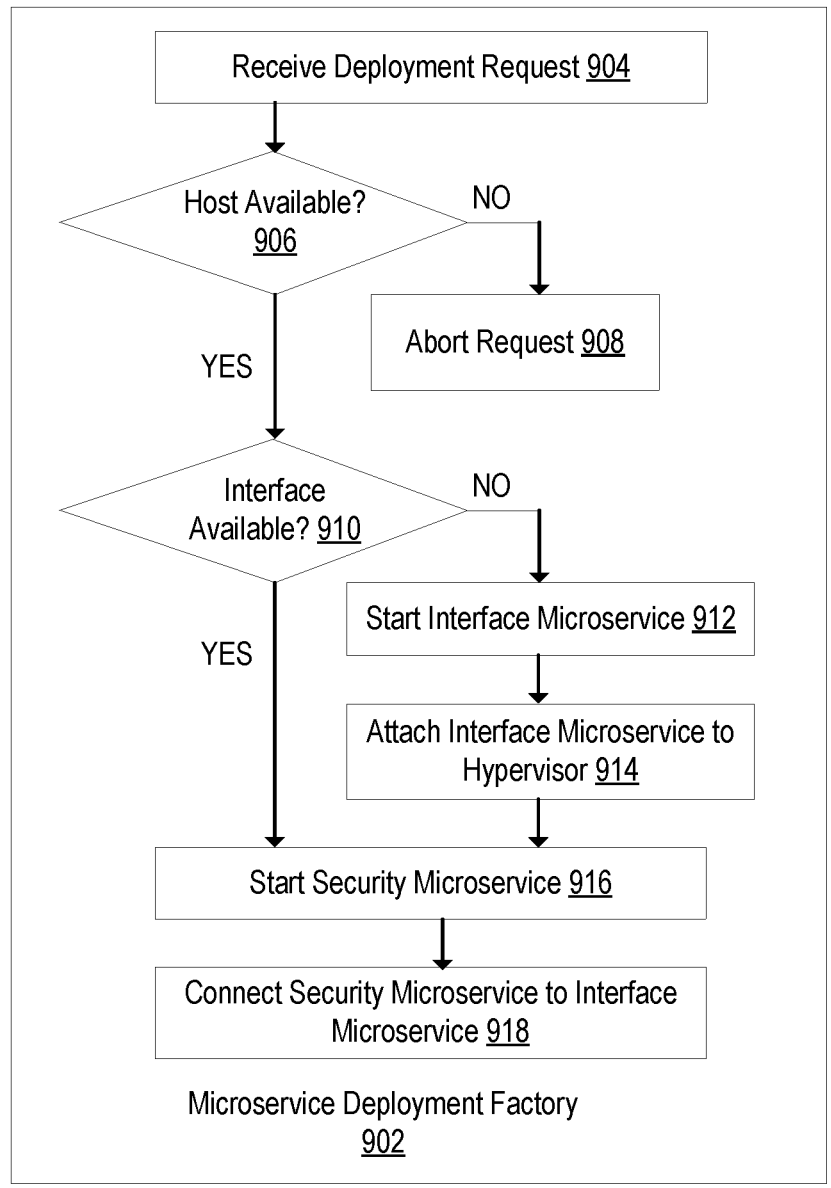
FIG. 9 is a flow diagram illustrating an example process for deploying a microservice on a host using a deployment factory according to an embodiment.

FIG. 9 is a flow diagram illustrating an example process for deploying a microservice on a host using a microservice deployment factory 902 according to an embodiment. At block 904, the microservice deployment factory 902 receives a deployment request to deploy a security microservice to a system. In some embodiments, the deployment request includes deployment specifications. In one embodiment, the deployment request is received from an existing microservice in response to an existing overloaded microservice requesting that a similar microservice be initialized to handle a portion of the traffic currently being handled by the existing microservice. In another embodiment, the microservice deployment factory 902 analyzes existing microservices and the amount of traffic they are handling, and automatically initiates a new deployment request on behalf of the existing systems.

At block 906, the microservice deployment factory 902 determines if there are any hosts (e.g., servers) available. At block 908, when the microservice deployment factory 902 determines that there are no hosts available, the request is aborted. In some embodiments, the microservice deployment factory 902 determines if a host includes less than a maximum number of interface microservices and that the security microservice to be added to the host can be merged with the existing interface microservices. In some embodiments, a host may be unavailable where it cannot handle additional microservices. When the microservice deployment factory 902 determines that there is at least one available host, the process proceeds to block 910.

At block 910, the microservice deployment factory 902 determines if an available host has an available interface microservice. In embodiments, the microservice deployment factory 902 determines whether the available host has an available interface microservice by accessing a host record for the available host stored in a deployment database. For example, referring to FIG. 9, the microservice deployment factory 902 may access host record 820 in the microservice deployment database 800 for an available host. In some embodiments, the microservice deployment factory 902 analyzes host records of the available hosts to determine the characteristics of each host, including the host compute resources 822, host memory resources 824, and host storage resources 826. The characteristics of each host is compared to the deployment specifications of the deployment request to identify the most suitable available host for placement of the security microservice. In some embodiments, the available host may have an existing interface microservice, but the existing interface microservice is not able to handle additional security microservices. In such embodiments, additional interface microservices may be added to the available host, if the available host has sufficient resources to handle the additional interface microservice.

At block 912, when the microservice deployment factory 902 determines that the host does not have an interface microservice or does not have an available interface microservice, the microservice deployment factory 902 starts an interface microservice on the available host. This interface microservice may be in addition to any existing interface microservices on the available host, or may be a first interface microservice on the available host. At block 914, the microservice deployment factory 902 then attaches the interface microservice to the hypervisor for the available host. In some embodiments, the microservice deployment database 800 is updated to indicate the addition of the new interface microservice. For example, the host interfaces section of the host record for the available host is updated to indicate that the available host has an interface microservice. This information can then be used to process future requests for new security microservices.

When the available host has an existing interface microservice available, or after a new interface microservice has been started and attached to the hypervisor for the available host, the process proceeds to block 916. At block 916, the microservice deployment factory 902 starts or initializes the requested security microservice. At block 918, the microservice deployment factory 902 connects the requested security microservice to the interface microservice of the available host. After the requested security microservice has been deployed, the requested security microservice is executed, and the requested security microservice can begin handling traffic.

Figure 10:
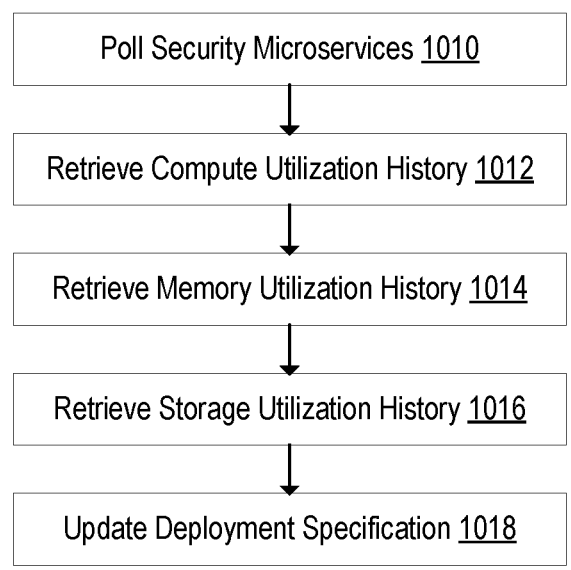
FIG. 10 is a flow diagram illustrating an example process for updating a deployment specification received in a deployment request according to an embodiment.

FIG. 10 is a flow diagram illustrating an example process for updating a deployment specification received in a deployment request according to an embodiment. At block 1010, in response to receiving the deployment request to initialize a new security microservice, the microservice deployment factory 902 polls the existing security microservices. At block 1012, the microservice deployment factory 902 retrieves compute utilization histories for one or more of the existing security microservices. At block 1014, the microservice deployment factory 902 retrieves memory utilization histories for one or more of the existing security microservices. At block 1016, the microservice deployment factory 902 retrieves storage utilization histories for one or more of the existing security microservices. Based on an analysis of the retrieved compute utilization history, memory utilization history, and storage utilization history, at block 1018, the microservice deployment factory 902 updates the deployment specification for the received deployment request. For example, the microservice deployment factory 902 may increase or decrease requirements specified in the deployment specification based on the utilization histories of existing security microservices. In this manner, the microservice deployment factory 902 updates the deployment specifications of security microservices based on the resource utilization of existing microservices. This capability allows for deployment of more microservices as the resource utilization prediction is based on the actual utilization rather than a worst-case estimate or other less-accurate methods.

Figure 11:
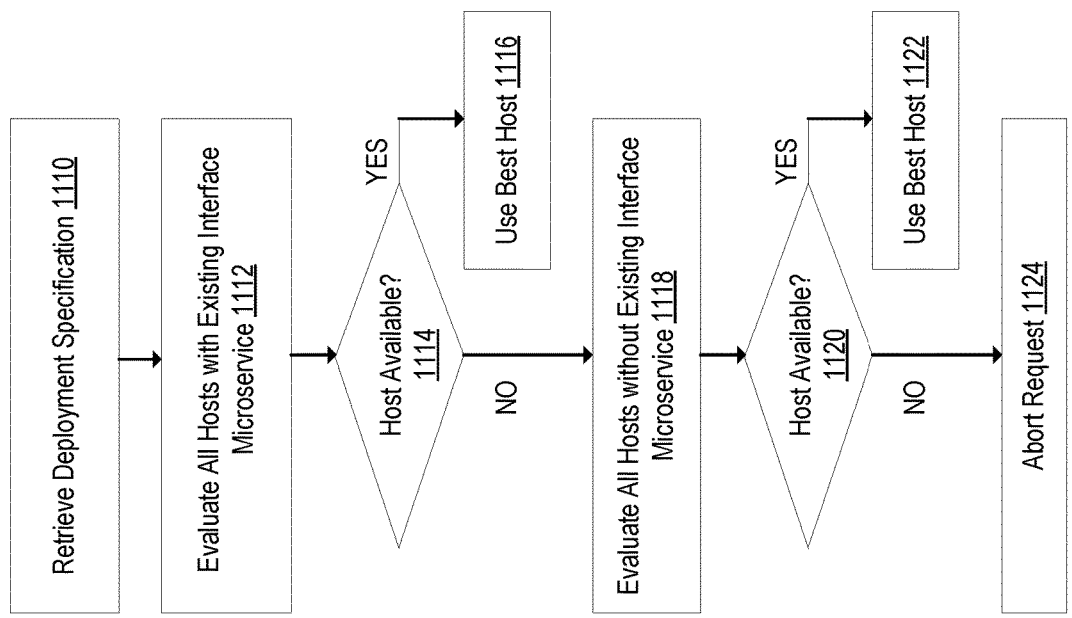
FIG. 11 is a flow diagram illustrating an example process for determining the availability of a host to satisfy a deployment request according to an embodiment.

FIG. 11 is a flow diagram illustrating an example process for determining the availability of a host to satisfy a deployment request according to an embodiment. At block 1110, the microservice deployment factory 902 receives or retrieves a deployment specification for a deployment request for a security microservice. At block 1112, the microservice deployment factory 902 evaluates hosts with existing interface microservices. In some embodiments, the microservice deployment factory 902 access or otherwise queries a microservice deployment database 800 to obtain information regarding existing hosts. For example, the microservice deployment factory 902 retrieves host records for hosts that have interface microservices already initialized within them.

At block 1114, the microservice deployment factory 902 determines if there is an available host among the hosts with existing interface microservices. In some embodiments, the microservice deployment factory 902, after determining the hosts that have existing interface microservices, determine whether any of these hosts can handle a new security microservice. For example, the microservice deployment factory 902 accesses the resources available to each host, including, for example, host computer resources 822, host memory resource 824, and host storage resources 826.

At block 1116, when there is an available host that has an interface microservice, the microservice deployment factory 902 selects the most suitable available host. In some embodiments, the microservice deployment factory 902 selects the most suitable available host based on the resources available to each available host, as defined in the corresponding host records for each available host. For example, based on the resources available to the determined hosts, microservice deployment factory 902 can determine whether there is an existing host with an interface microservice that has resources available to house the security microservice being requested in the deployment request.

The most suitable host calculation may be performed by determining which hosts have sufficient resources to satisfy the deployment specification of the microservice and selecting the host with the least available resources. This method acts to fully utilize hosts more quickly (rather than balancing hosts) such that the number of hosts with available resources decreases more quickly. Such a goal allows faster consolidation of security microservices to a smaller number of hosts, thereby freeing some hosts to perform more non-security applications without sharing resources with security services. Other methods of calculating the most suitable host, to achieve other goals such as even balancing of security microservices over datacenter servers, may also be used.

At block 1118, when the result of the analysis of block 1114 indicates that there are no available hosts with an interface microservice, the microservice deployment factory 902 evaluates hosts without existing interface microservices. In some embodiments, there may be no available hosts with interface microservices when these hosts do not have the resources to handle any additional security microservices being placed on the hosts. Similar to block 1114, the microservice deployment factory 902 may evaluate the host computer resources, host memory resource, and host storage resources associated with each host without an existing interface microservice. This data can be used by the microservice deployment factory 902 to determine which host without an existing interface microservice has the resources available needed to satisfy the resource requirements of a new interface microservice and the requested security microservice. At block 1120, the microservice deployment factory 902 determines if there is an available host among the hosts without existing interface microservices. At block 1122, when there is an available host that does not have an interface microservice, the microservice deployment factory 902 selects the most suitable available host. This may be determined based on the resources currently available to the hosts that do not have interface microservices and may be performed in a manner similar to that described for the calculation in block 1116. In such scenarios, the microservice deployment factory 902 would start and attach an interface microservice in the selected host, as described above in steps 912 and 914 of FIG. 9. At block 1124, when there are no hosts available, the request is aborted. In this situation, the microservice deployment factory 902 will have determined that there are no hosts available with existing interface microservices that can handle the requested security microservice, and that there are not hosts available without existing interface microservices that can handle the requested security microservice as well as a new interface microservice.

In an embodiment, the determination of a most suitable available host at blocks 1116 and 1122 can include weighting the available resources. For example, hosts may first be evaluated based on comparing the deployment specification against all hosts and selecting a host that has sufficient resources for all elements of the deployment specification. In environments that process significant I/O (such as network traffic as measured by IOPs, bandwidth or other metric), current I/O loading can be combined with compute, memory or storage loads to bias selection of a host away from heavily I/O loaded hosts. In some embodiments for environments that are memory constrained, a host may be selected if it meets the memory requirements even if the compute and storage requirements are not met. In general, various weightings and prioritizations can be used to provide a calculation of best suitability most appropriate for specific environments.

2.3. Generating Server Profile Data

In one embodiment, a security application can generate profile data for servers in a computing environment. In this context, a server can refer broadly to any type of physical server, virtual server, or other type of computing resource. A server can be associated with various operational "dimensions" potentially relevant to providing security services to the server. Examples of operational dimensions for a server might include, but are not limited to, applications running on a server, operating systems running on the server, networks to which a server is connected or with which the server otherwise communicates, protocols used in network traffic sent or received by a server, types of content stored by or accessible to a server, namespaces associated with a server, and so forth.

In an embodiment, profile data for a server can be generated based on various types of probes and other data collection mechanisms used to collect information about the server. For example, a security application might include a hypervisor probe used to collect information relating to a hypervisor running on the server, a VM probe used to collect information relating to VMs hosted by a hypervisor, and a general probe used to collect other types of device profile information based on monitoring network traffic sent and received by a server. As used herein, a probe generally refers to any process (e.g., an application, API, script, etc.) for obtaining profile information related to a server or other computing device.

In an embodiment, some potential security threats to servers can be characterized based on the dimensions associated with the servers. For example, determining that a VM or application running on the VM has an unusual number of users authenticated at the same time might indicate a potential security threat. Other example types of security threats might relate to understanding which users are associated with various applications (e.g., some users might not have permission to access certain applications), relate to types of data to which specified users have access, how particular types of network traffic are treated, and so forth. As described in more detail herein, these dimensions represent variables which can be considered, for example, when a server is added to a security policy group, where a security policy group can be associated with one or more security policies used to provide security services to the servers in the group.

2.4. Security Policies

As described above, a security application can provide security services to servers and computer networks based on the assignment of servers to security policy groups, where each security policy group can be associated with one or more security policies. At a high level, a security policy defines a set of security-related rules and policies to be applied to one or more servers, networks, or both. A security policy can include component policies including an access control list (ACL) policy, a malware policy, a data leakage protection (DLP) policy, and a threat detection policy. The example component policies are provided for illustrative purposes only; other security policies may include a different set of component policies, and different security policies within a set of security policies may contain different types of component security policies.

3.0. Functional Overview

Approaches, techniques, and mechanisms are disclosed to enable the insertion and configuration of interface microservices at servers or other types of computing devices in a computing environment in response to changes to security policies affecting one or components of the computing environment. In one embodiment, a security application detects servers in a computing environment and generates profile data for the detected servers. The profile data generated for a server can include information about applications running on the server, networks with which the server communicates, types of network traffic sent and received by the server, and so forth. In one embodiment, the security application comprises a microservice based security application, such as security service 410.

In an embodiment, a security application assigns detected servers to security policy groups by applying a set of filters to the generated profile data for each server in an order specified by a set of precedence rules. For example, each filter can be associated with a security policy group and, when a filter matches the profile data generated for a server, the server can be assigned to the security policy group associated with the matching filter.

In an embodiment, the security policy groups are each associated with one or more security policies that define security rules and other configurations used to provide security services to servers that are members of the corresponding security policy group. As described above in Section 2.2, a security application can use an interface microservice as a "hook" into a hypervisor associated with the server to obtain information about the server, to access network traffic sent and received by the server, and to provide other access points used to implement the security services according to the associated security policy.

In an embodiment, a security application can detect changes to a security policy associated with one or more security policy groups. For example, an administrator might update a security policy to specify that servers associated with a security policy are to begin intercepting and processing network traffic associated with one or more protocols, to indicate that network traffic from one or more specified networks is now prohibited, or to specify any other change to a security policy configuration. In response to detecting a change to the security policy, the security application can add, remove, or configure an interface microservice associated with the corresponding servers such that the security services can be provided according to the updated security policy. For example, if a security policy changes from inspecting to intercepting and processing network traffic, the security application can either add a new interface microservice or configure an existing interface microservice at servers that are members of a security policy group associated with the updated security policy. In this manner, the addition and configuration of interface microservices can be accomplished automatically in response to the creation and configuration of security policies, and without an administrator or other user manually installing and configuring interface microservices in anticipation of additions or changes to security policies within a computing environment.

Figure 12:
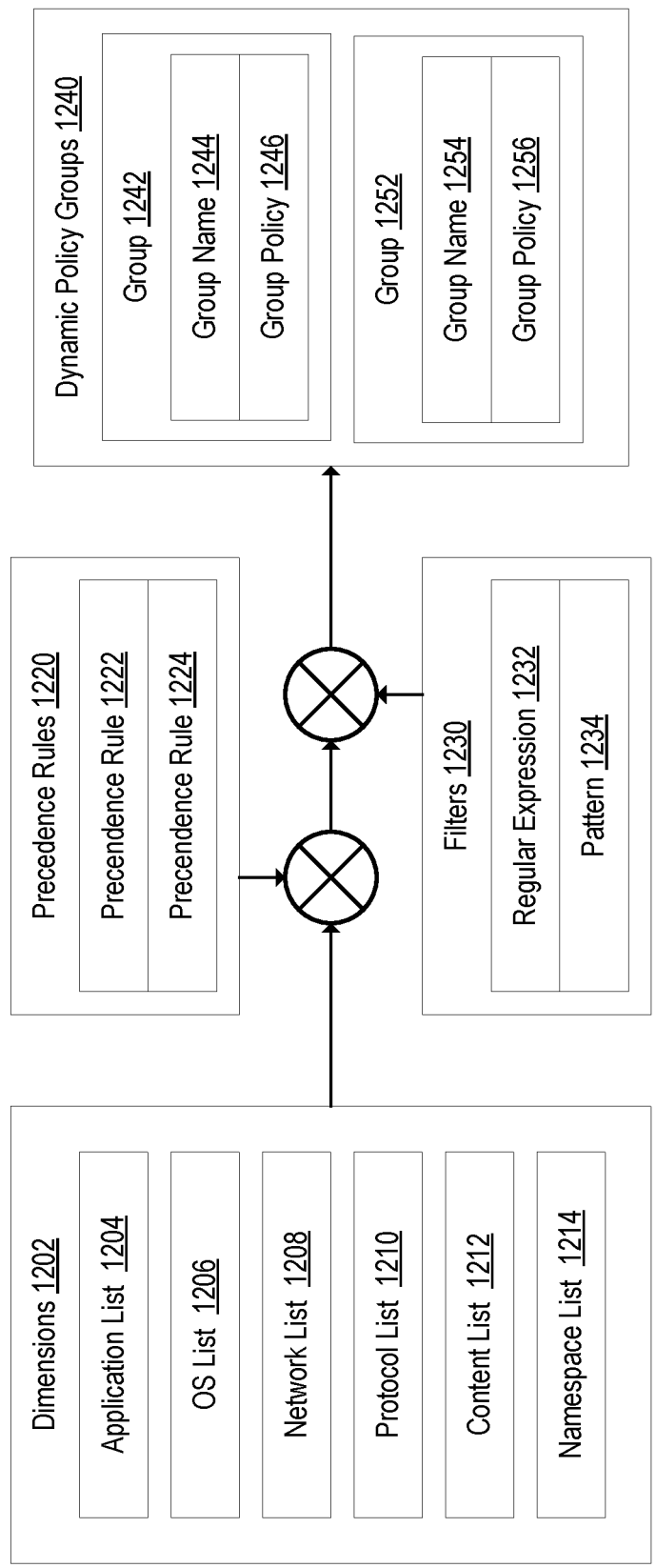
FIG. 12 is a block diagram illustrating the assignment of servers to security policy groups based on applying filters to profile data generated for the servers.

FIG. 12 depicts various components of a security application which can insert and configure interface microservices based on detecting the addition of servers and changes to security policies related to a computing environment. In one embodiment, a security application includes dimensions 1202, precedence rules 1220, filters 1230, and dynamic policy groups 1240 used to assign servers to policy groups. The components shown in FIG. 12 are provided for illustrative purposes; other implementations might include a different number of components or different types of components.

In an embodiment, dimensions 1202 include profile data collected for servers detected in a computing environment and which are to be added to one or more of dynamic policy groups 1240. For example, the dimensions can include an application list 1204 (e.g., indicating applications installed at a server), an operating system list 1206 (e.g., indicating one or more operating systems installed at a server), a network list 1208 (e.g., indicating one or more networks with which a server is connected or with which a server communicates), a protocol list 1210 (e.g., indicating one or more protocols associated with network traffic sent or received by a server), a content list 1212 (e.g., indicating types of content stored by a server), and a namespace list 1214 (e.g., indicating a namespace associated with a server). As described above in Section 2.2, the profile information for servers can be collected based on various types of probes, network traffic monitoring components, or other techniques used to collect information from a server or other type of computing device.

In an embodiment, a determination of a server's membership to one or more of dynamic groups 1240 is based on applying filters 1230 to the dimension data 1202 in an order defined by a set of precedence rules 1220 (e.g., precedence rule 1222 and precedence rule 1224). For example, to determine group membership for servers in one example computing environment, an administrator might consider a type of operating system associated with the servers to be highly relevant when selecting a security policy to apply to the servers. Thus, in this example, the precedence rules 1220 can be configured to specify that filters 1230 are applied to the operating system profile data before applying the filters to profile data related to applications, networks, protocols, and other profile data. In a different computing environment, an administrator might consider a namespace associated with servers to be highly relevant to group assignment and, accordingly, the precedence rules can specify that a namespace indicated in the profile data is examined using the filters 1230 before other dimensions. In an embodiment, a filter might include a regular expression 1232, a pattern 1234, a query, or use any other technique to filter the dimension data 1202. In an embodiment, filters can be applied to the profile data in the order specified in the precedence rules until a match is identified and, if no match is identified, a server can be added to a default group, added to a new group, or not added to any group.

As described above, based on identifying a matching filter from filters 1230 and a group from dynamic policy groups 1240 associated with the matching filter, a server can be assigned to a dynamic policy group. In an embodiment, each of the dynamic policy groups (e.g., group 1242 and 1252) is associated with a name and at least one security policy. For example, group 1242 includes a group name 1244 and group policy 1246, and group 1252 includes a group name 1254 and a group policy 1256. A group name, for example, can be a human-readable label or any other identifier for the group. A security policy can include rules or other configurations used by a security application to provide security services to servers to which the security policy is applied. Each security policy can be associated with one or more groups, and each policy group can be associated with one or more different security policies. In an embodiment, security policies can be updated over time and, in response to a change to a security policy, a security application can deploy the updated security to servers assigned to policy group(s) associated with the security policy.

Figure 13:
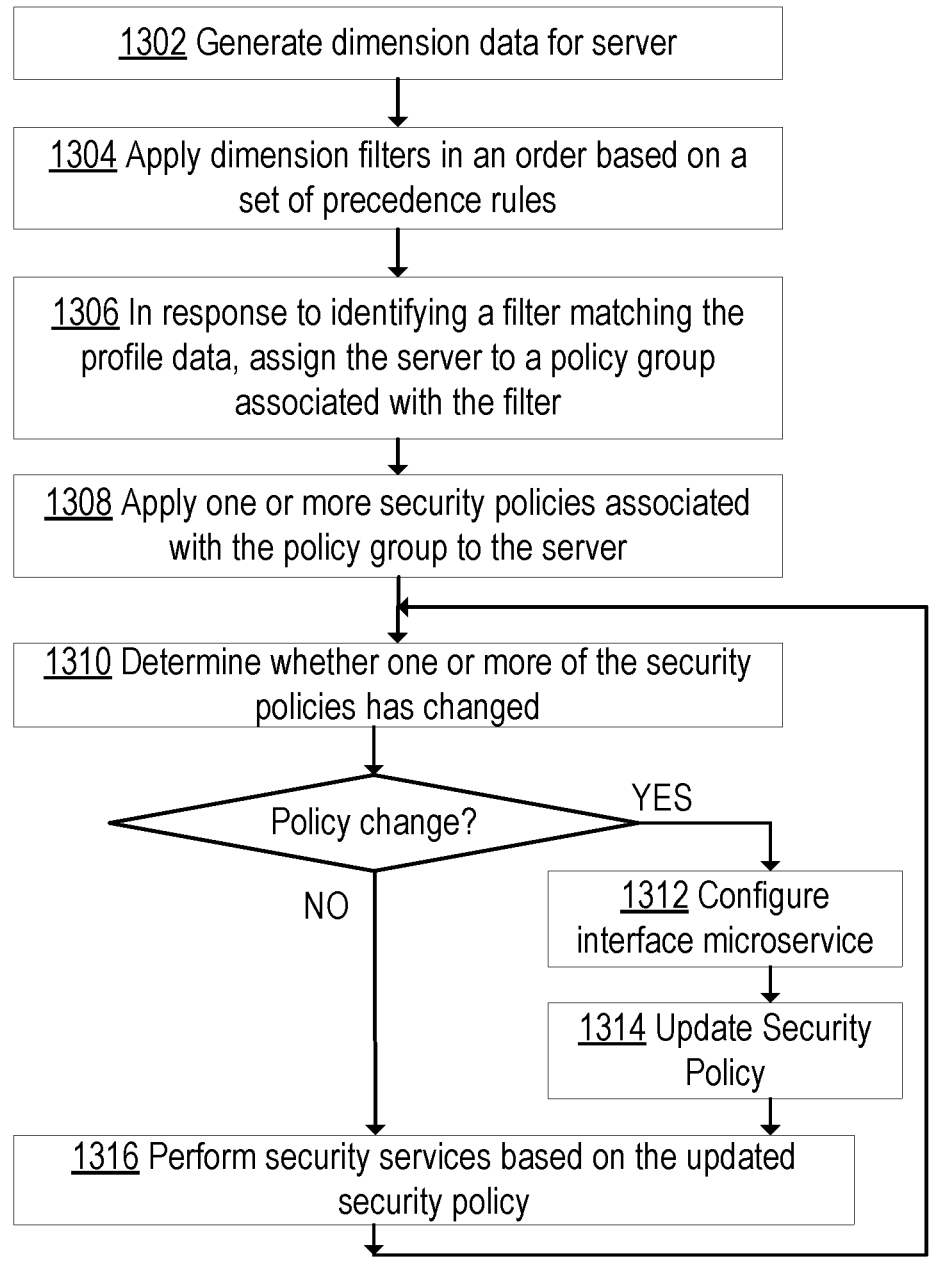
FIG. 13 is a flow diagram illustrating an example method for inserting an interface microservice in response to detecting a change to a security policy.

FIG. 13 is a flow diagram illustrating a process for inserting and configuring interface microservices based on detecting changes to security policies associated with one or more servers. In an embodiment, some or all of the steps described in FIG. 13 are performed by a component of a microservice-based security application service 410, such as a configuration microservice, security orchestration microservice, etc., or any combination of component microservices.

At block 1302, the security application service generates dimension data, also referred to herein as profile data, for a server. For example, the server might be a new server added to a computing environment and detected by the security service, or an existing server for which it is desired to provide security services. In one embodiment, the generation of the dimension data includes at least monitoring network traffic sent and received by the server, and can further include obtaining various types information by probing and other information gathering techniques.

At block 1304, the security application service applies a set of dimension filters to the dimension data in an order based on a set of precedence rules. For example, if the dimension data includes data related to operating systems, applications, protocols, networks, etc., associated with a server, an example set of precedence rules might specify to apply a set of filters to the application data first, to the operation systems data second, etc., until a match is detected or until all filters have been applied and no match is detected. In an embodiment, the application of a filter to the dimension data can include use of a regular expression, a pattern, a query, or any other searching mechanism or combination thereof.

At block 1306, in response to identifying a filter matching the profile data, the security application service assigns the server to a policy group associated with the filter. For example, each filter can be associated with one or more security policy groups so that servers with similar characteristics are grouped together. In an embodiment, security application service can store the assignment of servers to security policy groups in a security policy groups database or any other type of data store.

At block 1308, the security application service applies one or more security policies associated with the policy group to the server. For example, the security application can apply the security policies to the servers by sending configuration information indicating the one or more security policies to the server. The configuration information can include instructions causing the server to install an interface microservice if an interface microservice does not currently exist on the server, to modify of the operation of one or more security microservices already existing on the server, the deployment of additional security microservices on the server or the removal of security microservices on the server.

At block 1310, the security application service detects a change in a group security policy. In general, the detected change in the group security policy can include any change affecting how security services are provided to servers associated with the security policy. As one example, a security application might detect that a system administrator or other user has updated a group security policy (e.g., using a graphical security application configuration interface) instructing the associated servers to intercept and process defined types of network traffic sent and received by the servers. As another example, an update to a group security policy might include identifying one or more source networks, protocols, or other types of network traffic to block.

At block 1312, if a group security policy change is detected, the security application service configures an interface microservice at one or more servers associated with the security policy. In an embodiment, configuring the interface microservice can include adding, removing, or configuring an existing interface microservice based on the security policy. As an example, a change in security policy may cause associated interface microservices to alter operation from one of passive network traffic monitoring and inline enforcement to the other. As another example, a selection between passive monitoring and inline enforcement for specific users, applications, or other classes of network traffic may be changed as part of the configuration of an existing microservice.

For example, if a detected change to security policy indicates that associated servers are to begin intercepting and processing defined types of network traffic, and the security application service determines that an interface microservice is not currently available for one or more of the servers associated with the updated security policy, the security application service can cause a new interface microservice to be installed such that the security application server can communicate with the one or more servers. The installation of the interface microservice, for example, enables the security application service to instruct the servers to perform the network traffic monitoring as defined in the updated security policy. As another example, if the security application service detects that a security policy is updated to change from passive monitoring of network traffic to active monitoring and processing of network traffic, the security application service can update an existing interface microservice on associated servers to enable the active network traffic monitoring and processing operations.

At block 1314, the security application service applies the updated security policy to servers that are part of a security policy group associated with the security policy. For example, the security application service can apply a security policy by installing a set of policy rules or other configurations at servers associated with the security policy. As one example, if an updated security policy identifies particular source networks and protocols to be blocked by servers, the policy rules can define rules or other configurations for blocking the identified source networks and protocols at the servers.

At block 1316, based on the updated security policy applied at block 1314, or if the security application service does not detect a change to any group security policy at block 1310, the security application provides security services according to the current set of security policies. In general, security policies configure and guide the operation of the component security microservices of the security application. For example, a security policy limiting the use of a file-sharing application may include interface policies such as IP address blocking, TCP/IP policies such as changing the minimum reassembled length of TCP/IP transmissions for unrecognized ports and protocols, and enabling certain patterns within DLP processing.

4.0. Example Embodiments

Examples of some embodiments are represented, without limitation, by the following:

In an embodiment, a method or non-transitory computer readable medium comprises: generating, for a server of a computing environment, profile data indicating values for a plurality of properties associated with the server; assigning the server to a server group of a plurality of server groups based on applying at least one of a precedence rule and a filter to the profile data; detecting an update to a security policy associated with the server group; and in response to detecting the update to the security policy, configuring an interface microservice associated with the server based on the updated security policy, wherein the interface microservice enables a security application to communicate with the server.

In an embodiment, a method or non-transitory computer readable medium comprises: wherein configuring the interface microservice includes installing the interface microservice at a computer system hosting the server.

In an embodiment, a method or non-transitory computer readable medium comprises: wherein the update to the security policy includes a change from passive to active monitoring of network traffic, and wherein configuring the interface microservice includes changing the interface microservice to actively monitor and process network traffic.

In an embodiment, a method or non-transitory computer readable medium comprises: wherein the plurality of properties includes one or more of: a set of applications running on the server, an operating system running on the server, a set of networks associated with the server, a set of network protocols associated with the server, a set of content types associated with the server, a set of namespaces associated with the server.

In an embodiment, a method or non-transitory computer readable medium comprises: assigning the server to the server group by: applying the filter to the profile data, wherein the filter identifies one or more server groups of the plurality of server groups to which the server is assigned when a value of the profile data matches the filter.

In an embodiment, a method or non-transitory computer readable medium comprises: applying the filter to the profile data, wherein the filter identifies one or more server groups of the plurality of server groups to which the server is assigned when a value of the profile data matches the filter; and wherein filters of the plurality of filters are applied to the profile data in an order specified by a set of precedence rules.

In an embodiment, a method or non-transitory computer readable medium comprises: wherein the filter includes one or more of: a regular expression, a pattern, and a query.

In an embodiment, a method or non-transitory computer readable medium comprises: wherein the server is a virtual machine hosted by a hypervisor, and wherein configuring the interface microservice includes enabling a security application to interface with the hypervisor hosting the server.

In an embodiment, a method or non-transitory computer readable medium comprises: wherein the computing environment is a server in a data center.

Other examples of these and other embodiments are found throughout this disclosure.

5.0. Implementation Mechanism—Hardware Overview

According to one embodiment, the techniques described herein are implemented by one or more special-purpose computing devices. The special-purpose computing devices may be desktop computer systems, portable computer systems, handheld devices, networking devices or any other device that incorporates hard-wired, program logic, or both to implement the techniques. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination thereof. Such special-purpose computing devices may also combine custom hard-wired logic, ASICs, or FPGAs with custom programming to accomplish the techniques.

Figure 14:
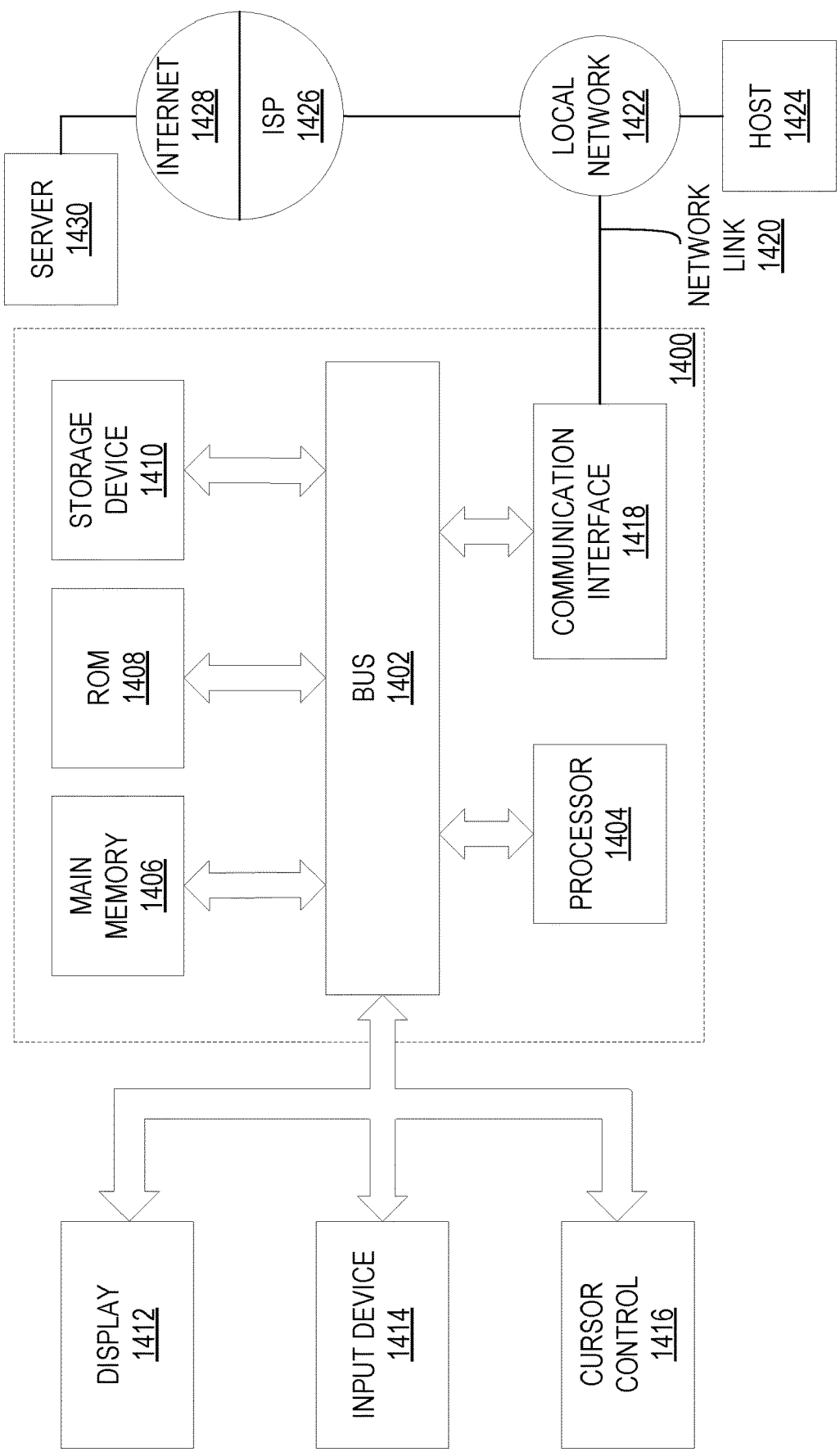
FIG. 14 illustrates a computer system upon which an embodiment may be implemented.

FIG. 14 is a block diagram that illustrates a computer system 1400 utilized in implementing the above-described techniques, according to an embodiment. Computer system 1400 may be, for example, a desktop computing device, laptop computing device, tablet, smartphone, server appliance, computing mainframe, multimedia device, handheld device, networking apparatus, or any other suitable device.

Computer system 1400 includes one or more buses 1402 or other communication mechanism for communicating information, and one or more hardware processors 1404 coupled with buses 1402 for processing information. Hardware processors 1404 may be, for example, general purpose microprocessors. Buses 1402 may include various internal and/or external components, including, without limitation, internal processor or memory busses, a Serial ATA bus, a PCI Express bus, a Universal Serial Bus, a HyperTransport bus, an Infiniband bus, and/or any other suitable wired or wireless communication channel.

Computer system 1400 also includes a main memory 1406, such as a random access memory (RAM) or other dynamic or volatile storage device, coupled to bus 1402 for storing information and instructions to be executed by processor 1404. Main memory 1406 also may be used for storing temporary variables or other intermediate information during execution of instructions to be executed by processor 1404. Such instructions, when stored in non-transitory storage media accessible to processor 1404, render computer system 1400 a special-purpose machine that is customized to perform the operations specified in the instructions.

Computer system 1400 further includes one or more read only memories (ROM) 1408 or other static storage devices coupled to bus 1402 for storing static information and instructions for processor 1404. One or more storage devices 1410, such as a solid-state drive (SSD), magnetic disk, optical disk, or other suitable non-volatile storage device, is provided and coupled to bus 1402 for storing information and instructions.

Computer system 1400 may be coupled via bus 1402 to one or more displays 1412 for presenting information to a computer user. For instance, computer system 1400 may be connected via an High-Definition Multimedia Interface (HDMI) cable or other suitable cabling to a Liquid Crystal Display (LCD) monitor, and/or via a wireless connection such as peer-to-peer Wi-Fi Direct connection to a Light-Emitting Diode (LED) television. Other examples of suitable types of displays 1412 may include, without limitation, plasma display devices, projectors, cathode ray tube (CRT) monitors, electronic paper, virtual reality headsets, braille terminal, and/or any other suitable device for outputting information to a computer user. In an embodiment, any suitable type of output device, such as, for instance, an audio speaker or printer, may be utilized instead of a display 1412.

One or more input devices 1414 are coupled to bus 1402 for communicating information and command selections to processor 1404. One example of an input device 1414 is a keyboard, including alphanumeric and other keys. Another type of user input device 1414 is cursor control 1416, such as a mouse, a trackball, or cursor direction keys for communicating direction information and command selections to processor 1404 and for controlling cursor movement on display 1412. This input device typically has two degrees of freedom in two axes, a first axis (e.g., x) and a second axis (e.g., y), that allows the device to specify positions in a plane. Yet other examples of suitable input devices 1414 include a touch-screen panel affixed to a display 1412, cameras, microphones, accelerometers, motion detectors, and/or other sensors. In an embodiment, a network-based input device 1414 may be utilized. In such an embodiment, user input and/or other information or commands may be relayed via routers and/or switches on a Local Area Network (LAN) or other suitable shared network, or via a peer-to-peer network, from the input device 1414 to a network link 1420 on the computer system 1400.

A computer system 1400 may implement techniques described herein using customized hard-wired logic, one or more ASICs or FPGAs, firmware and/or program logic which in combination with the computer system causes or programs computer system 1400 to be a special-purpose machine. According to one embodiment, the techniques herein are performed by computer system 1400 in response to processor 1404 executing one or more sequences of one or more instructions contained in main memory 1406. Such instructions may be read into main memory 1406 from another storage medium, such as storage device 1410. Execution of the sequences of instructions contained in main memory 1406 causes processor 1404 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical or magnetic disks, such as storage device 1410. Volatile media includes dynamic memory, such as main memory 1406. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, an EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1402. Transmission media can also take the form of acoustic or light waves, such as those generated during radio-wave and infra-red data communications.

Various forms of media may be involved in carrying one or more sequences of one or more instructions to processor 1404 for execution. For example, the instructions may initially be carried on a magnetic disk or a solid state drive of a remote computer. The remote computer can load the instructions into its dynamic memory and use a modem to send the instructions over a network, such as a cable network or cellular network, as modulate signals. A modem local to computer system 1400 can receive the data on the network and demodulate the signal to decode the transmitted instructions. Appropriate circuitry can then place the data on bus 1402. Bus 1402 carries the data to main memory 1406, from which processor 1404 retrieves and executes the instructions. The instructions received by main memory 1406 may optionally be stored on storage device 1410 either before or after execution by processor 1404.

A computer system 1400 may also include, in an embodiment, one or more communication interfaces 1418 coupled to bus 1402. A communication interface 1418 provides a data communication coupling, typically two-way, to a network link 1420 that is connected to a local network 1422. For example, a communication interface 1418 may be an integrated services digital network (ISDN) card, cable modem, satellite modem, or a modem to provide a data communication connection to a corresponding type of telephone line. As another example, the one or more communication interfaces 1418 may include a local area network (LAN) card to provide a data communication connection to a compatible LAN. As yet another example, the one or more communication interfaces 1418 may include a wireless network interface controller, such as a 802.11-based controller, Bluetooth controller, Long Term Evolution (LTE) modem, and/or other types of wireless interfaces. In any such implementation, communication interface 1418 sends and receives electrical, electromagnetic, or optical signals that carry digital data streams representing various types of information.

Network link 1420 typically provides data communication through one or more networks to other data devices. For example, network link 1420 may provide a connection through local network 1422 to a host computer 1424 or to data equipment operated by a Service Provider 1426. Service Provider 1426, which may for example be an Internet Service Provider (ISP), in turn provides data communication services through a wide area network, such as the world wide packet data communication network now commonly referred to as the "Internet" 1428. Local network 1422 and Internet 1428 both use electrical, electromagnetic or optical signals that carry digital data streams. The signals through the various networks and the signals on network link 1420 and through communication interface 1418, which carry the digital data to and from computer system 1400, are example forms of transmission media.

In an embodiment, computer system 1400 can send messages and receive data, including program code and/or other types of instructions, through the network(s), network link 1420, and communication interface 1418. In the Internet example, a server 1430 might transmit a requested code for an application program through Internet 1428, ISP 1426, local network 1422 and communication interface 1418. The received code may be executed by processor 1404 as it is received, and/or stored in storage device 1410, or other non-volatile storage for later execution. As another example, information received via a network link 1420 may be interpreted and/or processed by a software component of the computer system 1400, such as a web browser, application, or server, which in turn issues instructions based thereon to a processor 1404, possibly via an operating system and/or other intermediate layers of software components.

In an embodiment, some or all of the systems described herein may be or comprise server computer systems, including one or more computer systems 1400 that collectively implement various components of the system as a set of server-side processes. The server computer systems may include web server, application server, database server, and/or other conventional server components that certain above-described components utilize to provide the described functionality. The server computer systems may receive network-based communications comprising input data from any of a variety of sources, including without limitation user-operated client computing devices such as desktop computers, tablets, or smartphones, remote sensing devices, and/or other server computer systems.

In an embodiment, certain server components may be implemented in full or in part using "cloud"-based components that are coupled to the systems by one or more networks, such as the Internet. The cloud-based components may expose interfaces by which they provide processing, storage, software, and/or other resources to other components of the systems. In an embodiment, the cloud-based components may be implemented by third-party entities, on behalf of another entity for whom the components are deployed. In other embodiments, however, the described systems may be implemented entirely by computer systems owned and operated by a single entity.

In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

6.0. Extensions and Alternatives

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. In this regard, although specific claim dependencies are set out in the claims of this application, it is to be noted that the features of the dependent claims of this application may be combined as appropriate with the features of other dependent claims and with the features of the independent claims of this application, and not merely according to the specific dependencies recited in the set of claims. Moreover, although separate embodiments are discussed herein, any combination of embodiments and/or partial embodiments discussed herein may be combined to form further embodiments.

Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
generating, for a server of a computing environment, profile data indicating values for a plurality of properties associated with the server;
assigning the server to a server group of a plurality of server groups by applying at least one a filter to the profile data indicating values for the plurality of properties associated with the server, wherein the at least one filter is applied to the profile data in an order specified by a set of precedence rules;
detecting an update to a security policy associated with the server group; and
in response to detecting the update to the security policy, configuring an interface microservice associated with the server based on the updated security policy, wherein the interface microservice enables a security application to communicate with the server.

2. The method of claim 1, wherein configuring the interface microservice includes installing the interface microservice at a computer system hosting the server.

3. The method of claim 1, wherein the update to the security policy includes a change from passive to active monitoring of network traffic, and wherein configuring the interface microservice includes changing the interface microservice to actively monitor and process network traffic.

4. The method of claim 1, wherein the plurality of properties includes one or more of: a set of applications running on the server, an operating system running on the server, a set of networks associated with the server, a set of network protocols associated with the server, a set of content types associated with the server, a set of namespaces associated with the server.

5. The method of claim 1, further comprising assigning the server to the server group by:
applying the filter to the profile data, wherein the filter identifies one or more server groups of the plurality of server groups to which the server is assigned when a value of the profile data matches the filter.

6. The method of claim 1, further comprising assigning the server to the server group by:
applying the filter to the profile data, wherein the filter identifies one or more server groups of the plurality of server groups to which the server is assigned when a value of the profile data matches the filter; and
wherein filters of the plurality of filters are applied to the profile data in an order specified by a set of precedence rules.

7. The method of claim 1, wherein the filter includes one or more of: a regular expression, a pattern, and a query.

8. The method of claim 1, wherein the server is a virtual machine hosted by a hypervisor, and wherein configuring the interface microservice includes enabling a security application to interface with the hypervisor hosting the server.

9. A non-transitory machine-readable storage medium storing instructions which, when executed by a processor, cause performance of operations comprising:
generating, for a server of a computing environment, profile data indicating values for a plurality of properties associated with the server;
assigning the server to a server group of a plurality of server groups by applying at least one filter to the profile data indicating values for the plurality of properties associated with the server, wherein the at least one filter is applied to the profile data in an order specified by a set of precedence rules;
detecting an update to a security policy associated with the server group; and
in response to detecting the update to the security policy, configuring an interface microservice associated with the server based on the updated security policy, wherein the interface microservice enables a security application to communicate with the server.

10. The non-transitory machine-readable storage medium of claim 9, wherein configuring the interface microservice includes installing the interface microservice at a computer system hosting the server.

11. The non-transitory machine-readable storage medium of claim 9, wherein the update to the security policy includes a change from passive to active monitoring of network traffic, and wherein configuring the interface microservice includes changing the interface microservice to actively monitor and process network traffic.

12. The non-transitory machine-readable storage medium of claim 9, wherein the plurality of properties includes one or more of: a set of applications running on the server, an operating system running on the server, a set of networks associated with the server, a set of network protocols associated with the server, a set of content types associated with the server, a set of namespaces associated with the server.

13. The non-transitory machine-readable storage medium of claim 9, further comprising instructions which, when executed by the processor, cause performance of operations comprising:
assigning the server to the server group by:
applying the filter to the profile data, wherein the filter identifies one or more server groups of the plurality of server groups to which the server is assigned when a value of the profile data matches the filter.

14. The non-transitory machine-readable storage medium of claim 9, further comprising instructions which, when executed by the processor, cause performance of operations comprising:
assigning the server to the server group by:
applying a filter of a plurality of filters to the profile data, wherein the filter identifies one or more server groups of the plurality of server groups to which the server is assigned when a value of the profile data matches the filter; and
wherein filters of the plurality of filters are applied to the profile data in an order specified by a set of precedence rules.

15. The non-transitory machine-readable storage medium of claim 9, wherein the filter includes one or more of: a regular expression, a pattern, and a query.

16. The non-transitory machine-readable storage medium of claim 9, wherein the server is a virtual machine hosted by a hypervisor, and wherein configuring the interface microservice includes enabling a security application to interface with the hypervisor hosting the server.

17. An apparatus, comprising:
a processor;
a non-transitory machine-readable storage medium storing instructions which, when executed by the processor, causes the apparatus to:
generate, for a server of a computing environment, profile data indicating values for a plurality of properties associated with the server;

assign the server to a server group of a plurality of server groups by applying at least one filter to the profile data indicating values for the plurality of properties associated with the server, wherein the at least one filter is applied to the profile data in an order specified by a set of precedence rules;

detect an update to a security policy associated with the server group; and in response to detecting the update to the security policy, configure an interface microservice associated with the server based on the updated security policy, wherein the interface microservice enables a security application to communicate with the server.

18. The apparatus of claim 17, wherein configuring the interface microservice includes installing the interface microservice at a computer system hosting the server.

19. The apparatus of claim 17, wherein the update to the security policy includes a change from passive to active monitoring of network traffic, and wherein configuring the interface microservice includes changing the interface microservice to actively monitor and process network traffic.

20. The apparatus of claim 17, wherein the plurality of properties includes one or more of: a set of applications running on the server, an operating system running on the server, a set of networks associated with the server, a set of network protocols associated with the server, a set of content types associated with the server, a set of namespaces associated with the server.

* * * * *